United States Patent
Kim et al.

(10) Patent No.: US 9,888,263 B2
(45) Date of Patent: *Feb. 6, 2018

(54) METHOD AND DEVICE FOR ARITHMETIC CODING OF VIDEO, AND METHOD AND DEVICE FOR ARITHMETIC DECODING OF VIDEO

(71) Applicant: SAMSUNG ELECTRONICS CO., LTD., Suwon-si (KR)

(72) Inventors: Il-koo Kim, Osan-si (KR); Jeong-hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 215 days.

This patent is subject to a terminal disclaimer.

(21) Appl. No.: 14/636,571

(22) Filed: Mar. 3, 2015

(65) Prior Publication Data

US 2015/0181255 A1   Jun. 25, 2015

Related U.S. Application Data

(63) Continuation of application No. 14/357,048, filed as application No. PCT/KR2012/009412 on Nov. 8, 2012.

(Continued)

(51) Int. Cl.
    *H04N 19/91*   (2014.01)
    *H04N 19/13*   (2014.01)
    (Continued)

(52) U.S. Cl.
    CPC ............ *H04N 19/91* (2014.11); *H04N 19/13* (2014.11); *H04N 19/136* (2014.11);
    (Continued)

(58) Field of Classification Search
    CPC .......... H04N 19/70; H04N 7/26; H04N 11/04; H04N 19/13; H04N 19/18;
    (Continued)

(56) References Cited

U.S. PATENT DOCUMENTS 6,917,310 B2    7/2005  Pearson et al.
7,088,271 B2 *  8/2006  Marpe .................... H03M 7/40
                                                    341/107

(Continued)

FOREIGN PATENT DOCUMENTS

CN    101626244 A    1/2010
CN    101902639 A    12/2010

(Continued)

OTHER PUBLICATIONS

Benjamin Bross "WD-4:Working draft 4 for High-Efficiency Video Coding" JCTVC-F-803d3, Jul. 2011.*

(Continued)

*Primary Examiner* — Dramos I Kalapodas
(74) *Attorney, Agent, or Firm* — Sughrue Mion, PLLC

(57) ABSTRACT

Methods and apparatuses for arithmetic encoding/decoding of video data. The arithmetic decoding method includes arithmetically decoding prefix bit strings representing a two-dimensional location of a last significant coefficient in a block sequentially by using a context model, arithmetically decoding suffix bit strings in a bypass mode, and performing inverse binarization on the arithmetically decoded prefix bit strings and suffix bit strings to acquire the location of the last significant coefficient in the block.

2 Claims, 18 Drawing Sheets

Related U.S. Application Data

(60) Provisional application No. 61/557,103, filed on Nov. 8, 2011.

(51) Int. Cl.

| | | |
|---|---|---|
| *H04N 19/136* | (2014.01) | |
| *H04N 19/18* | (2014.01) | |
| *H04N 19/44* | (2014.01) | |
| *H04N 19/61* | (2014.01) | |
| *H04N 19/82* | (2014.01) | |
| *H04N 19/169* | (2014.01) | |
| *H04N 19/129* | (2014.01) | |
| *H04N 19/96* | (2014.01) | |

(52) U.S. Cl.
CPC ......... *H04N 19/18* (2014.11); *H04N 19/1887* (2014.11); *H04N 19/44* (2014.11); *H04N 19/61* (2014.11); *H04N 19/82* (2014.11); *H04N 19/129* (2014.11); *H04N 19/96* (2014.11)

(58) Field of Classification Search
CPC ............. H04L 29/06061; H04L 45/748; H04L 27/2678; H04L 69/06; G06F 9/30185; H03M 7/4043; H03M 7/4037; H03M 7/4081; H03M 7/00; G06T 9/00; G06T 19/91

See application file for complete search history.

(56) References Cited

U.S. PATENT DOCUMENTS

| | | | |
|---|---|---|---|
| 7,777,654 B2 | 8/2010 | Chang | |
| 7,839,311 B2 | 11/2010 | Bao et al. | |
| 7,961,122 B1 | 6/2011 | Lin | |
| 8,320,447 B2 | 11/2012 | Miyazaki | |
| 8,401,321 B2* | 3/2013 | Lee | H04N 19/13 382/232 |
| 8,604,950 B2 | 12/2013 | Sekiguchi et al. | |
| 9,172,976 B2* | 10/2015 | Chien | H03M 7/4018 |
| 9,191,683 B2 | 11/2015 | Sasai et al. | |
| 2004/0260739 A1 | 12/2004 | Schumann | H04N 19/91 708/322 |
| 2005/0123207 A1* | 6/2005 | Marpe | H04N 19/196 382/239 |
| 2007/0080832 A1* | 4/2007 | Yang | H03M 7/4006 341/50 |
| 2008/0219578 A1 | 9/2008 | Lee | |
| 2008/0310503 A1* | 12/2008 | Lee | H04N 19/61 375/240.2 |
| 2009/0096643 A1* | 4/2009 | Chang | H03M 7/4006 341/51 |
| 2010/0027624 A1* | 2/2010 | Yu | H04N 19/00 375/240.12 |
| 2010/0303147 A1* | 12/2010 | Miyazaki | H04N 19/91 375/240.02 |
| 2011/0310976 A1* | 12/2011 | Wang | H04N 19/176 375/240.24 |
| 2012/0189055 A1* | 7/2012 | Chien | H04N 19/52 375/240.14 |
| 2012/0300839 A1* | 11/2012 | Sze | H04N 19/91 375/240.12 |
| 2013/0028334 A1* | 1/2013 | Bossen | H03M 7/4018 375/240.25 |
| 2013/0051452 A1* | 2/2013 | Li | H04N 19/00072 375/240.01 |
| 2013/0114676 A1* | 5/2013 | Guo | H03M 7/4018 375/240.02 |
| 2013/0114738 A1* | 5/2013 | Chien | H03M 7/4018 375/240.24 |
| 2013/0251041 A1* | 9/2013 | Guo | H04N 19/513 375/240.16 |
| 2013/0272379 A1* | 10/2013 | Sole Rojals | H04N 19/176 375/240.02 |
| 2013/0322547 A1* | 12/2013 | Lou | H04N 19/91 375/240.24 |
| 2014/0029863 A1* | 1/2014 | Sasai | G06T 9/00 382/233 |

FOREIGN PATENT DOCUMENTS

| | | |
|---|---|---|
| JP | 2009100474 A | 5/2009 |
| KR | 10-2006-0038189 A | 5/2006 |
| KR | 10-2008-0082147 A | 9/2008 |
| KR | 10-2010-0128234 A | 12/2010 |
| KR | 10-1063426 B1 | 9/2011 |
| TW | 200608805 A | 3/2006 |
| TW | 200813884 A | 3/2008 |
| WO | 2009029797 A1 | 3/2009 |
| WO | 2013069246 A1 | 5/2013 |

OTHER PUBLICATIONS

Communication dated May 31, 2016, issued by the European Patent Office in counterpart European Application No. 12848182.7.
Joel Sole et al., "CE11: Unified scans for the significance map and coefficient level coding in high efficiency", JCT-VC of ITU-T SG16 WP3 and ISO/IEC JTC1/SC29/WG11, JCTVC-F288, 6th Meeting: Torino, IT, Jul. 14-22, 2011, Total 5 pages, XP 030009311.
Communication dated Apr. 26, 2016, issued by the Taiwanese Intellectual Property Office in counterpart Taiwanese Application No. 101141661.
Communication dated Mar. 22, 2016, issued by the Japanese Intellectual Property Office in counterpart Japanese Application No. 2014-540947.
Sole, et al., "Parallel Processing of Residual Data in HE", Joint Collaborative Team on Video Coding (JCT-VC) of ITU-T SG16 WP3 and ISO/IEC JTC1/SC29/WG11, JCTVC-F552, 6th Meeting, Jul. 16, 2011, Torino, Italy, 7 pages total.
Tabatabai, et al., "Tool Experiment 6: Intra Prediction Improvement", Joint Collaborative Team on Video Coding (JCT-VC) of ITU-T SG16 WP3 and ISO/IEC JTC1/SC29/WG11, JCTVC-B306_r2, 2nd Meeting, Jul. 30, 2010, Geneva Switzerland, 12 pages total.
Rosewarne, C. "Non-CE11: Modified context selection for Significant Coefficient Flags with Diagonal sub-block scan", Joint Collaborative Team on Video Coding (JCT-VC) of ITU-T SG16 WP3 and ISO/IEC JTC1/SC29/WG11, JCTVC-G958, 7th Meeting, Nov. 26, 2011, Geneva Switzerland, 9 pages total.
Communication dated Aug. 9, 2016, issued by the Japanese Patent Office in counterpart Japanese Patent Application No. 2014-540947.
International Search Report, dated Feb. 19, 2013, issued by the International Searching Authority in counterpart International Application No. PCT/KR2012/009412.
Written Opinion, dated Feb. 19, 2013, issued by the International Searching Authority in counterpart International Application No. PCT/KR2012/009412.
Bossen, Frank, "Common Test Conditions and Software Reference Configurations," Joint Collaborative Team on Video Coding (JCT-VC) of ITU-T SG16 WP3 and ISO/IEC JTC1/SC29/WG11, Jul. 14-22, 2011, pp. 1-3.
Communication dated Aug. 4, 2015 by the European Patent Office in related Application No. 12848182.7.
Chuang et al., "Non-CE1: Codeword reordering for last_significant_coeff_x and Last_significant_coeff_y", Joint Collaborative Team on Video Coding (JCT-VC) of ITU-T SG16 WP3 and ISO/IEC JTC1/SC29/WG11, 7th Meeting, Nov. 21-30, 2011, 3 total pages.
Seregin et al., "Binarisatiion modification for last position coding", Joint Collaborative Team on Video Coding (JCT-VC) of ITU-T SG16 WP3 and ISO/IEC JTC1/SC29/WG11, 6th Meeting, Jul. 14-22, 2011, 3 total pages.
Marpe et al., "Context-Based Adaptive Binary Arithmetic Coding in the H.264/AVC Video Compression Standard", IEEE Transactions on Circuits and Systems for Video Technology, vol. 13, No. 7, Jul. 1, 2003, pp. 620-636.

(56) References Cited

OTHER PUBLICATIONS

Communication dated Dec. 15, 2016 issued by the State Intellectual Property Office of P.R. China in counterpart Chinese Patent Application No. 201280066398.8.
Decision of Appeal dated Mar. 20, 2017, issued by the Korean Intellectual Property Office in counterpart Korean Application No. 10-2012-0126171.
Decision of Appeal dated Mar. 20, 2017, issued by the Korean Intellectual Property Office in counterpart Korean Application No. 10-2015-0040050.
Decision of Appeal dated Mar. 20, 2017, issued by the Korean Intellectual Property Office in counterpart Korean Application No. 10-2015-0040051.
Decision of Appeal dated Mar. 20, 2017, issued by the Korean Intellectual Property Office in counterpart Korean Application No. 10-2015-0040052.
Decision of Appeal dated Mar. 20, 2017, issued by the Korean Intellectual Property Office in counterpart Korean Application No. 10-2015-0040053.
Communication dated Apr. 21, 2017, issued by the Taiwanese Intellectual Property Office of Economic Affairs in counterpart Taiwanese Application No. 105129896.
Benjamin Bross, et al. "High Efficiency Video Coding text specification draft 9", Joint Collaborative Team on Video Coding (JCT-VC) of ITU-T SG16 WP3 and ISO/IEC JTC1/SC29/WG11, 11th Meeting: Sanghai, CN, Oct. 10-19, 2012, Document: JCTVC-K1003_v7, Total 290 pages.
Communication issued by the Korean Intellectual Property Office dated Nov. 13, 2017 in counterpart Korean Patent Application No. 10-2015-0040054.
Communication issued by the Taiwan Intellectual Property Office dated Nov. 20, 2017 in counterpart Taiwan Patent Application No. 106116416.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, 6th Meeting, Jul. 14-22, 2011, Total 229 pages, Version 7, Torino, IT, DOI: JCTVC-F803_d5.

\* cited by examiner

CODING UNIT (1010)

METHOD AND DEVICE FOR ARITHMETIC CODING OF VIDEO, AND METHOD AND DEVICE FOR ARITHMETIC DECODING OF VIDEO

CROSS REFERENCE TO RELATED APPLICATIONS

This application is a Continuation of U.S. application Ser. No. 14/357,048 filed May 8, 2014, which is a National Stage application under 35 U.S.C. §371 of International Application No. PCT/KR2012/009412, filed on Nov. 8, 2012, and claims the benefit of U.S. Provisional Application No. 61/557,103, filed on Nov. 8, 2011 in the United States Patent and Trademark Office, the disclosures of which are incorporated herein by reference in their entireties.

TECHNICAL FIELD

The present invention relates to encoding and decoding of video, and more particularly, to a method and apparatus for entropy encoding and decoding transformation coefficient information.

BACKGROUND ART

In an image compression method such as moving picture experts group (MPEG)-1, MPEG-2, and MPEG-4 H.264/MPEG-4 AVC (advanced video coding), an image is divided into blocks, each having a predetermined size, and residual data of each block is acquired by using an inter prediction or an intra prediction process. The residual data is compressed through processes such as transformation, quantization, scanning, run length coding, and entropy coding. During the entropy coding operation, a syntax element, for example, information about, for example, a transformation coefficient or a prediction mode, is entropy encoded, and a bit stream is output. A decoder parses the bit stream to extract syntax elements, and restores image based on the extracted syntax elements.

DISCLOSURE

Technical Problem

The present invention provides a method and apparatus for arithmetically encoding and decoding symbols of transformation coefficients by combining a context adaptive binary arithmetic coding (CABAC) method that has high calculation complexity while having a high compressive performance, and a bypass arithmetic coding method having lower calculation complexity than that of the CABAC method while showing less compressive throughput.

Technical Solution

According to the present invention, symbols regarding a location of a last significant coefficient is classified into a prefix and a suffix based on a predetermined critical value, and bit string classified as the prefix and bit string classified as the suffix are independently arithmetic encoded.

Advantageous Effects

According to the embodiments of the present invention, processing speed and compressive performance of arithmetic encoding and decoding can be improved through trade-off between calculation complexity and processing speed, by applying the CABAC method that has high calculation complexity while having a high compressive performance, and the bypass arithmetic coding method having lower calculation complexity than that of the CABAC method while showing less compressive throughput.

BEST MODE

Figure 1:
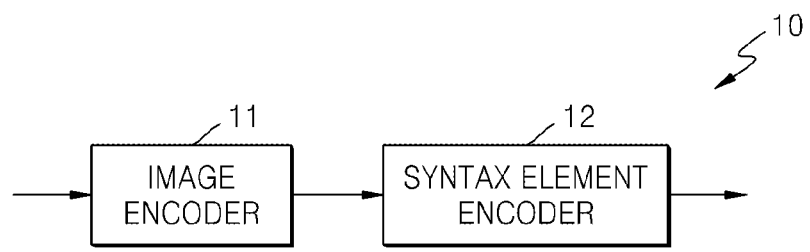
FIG. 1 is a block diagram of a video encoding apparatus according to an embodiment of the present invention.

According to an aspect of the present invention, there is provided an arithmetic decoding method for decoding video, the method comprising: acquiring a first coordinate prefix syntax element and a first coordinate suffix syntax element respectively corresponding to a first coordinate prefix bit string and a first coordinate suffix bit string that are obtained by classifying a first coordinate location of a last significant coefficient of a current block based on a critical value determined based on a size of the current block, and a second coordinate prefix syntax element and a second coordinate suffix syntax element respectively corresponding to a second coordinate prefix bit string and a second coordinate suffix bit string that are obtained by classifying a second coordinate location of the last significant coefficient based on the critical value, from a received bit stream; acquiring the first coordinate prefix bit string and the second coordinate prefix bit string by performing arithmetic decoding operations sequentially with respect to the first coordinate prefix syntax element and the second coordinate prefix syntax element in a first arithmetic decoding method; acquiring the first coordinate suffix bit string and the second coordinate suffix bit string by performing arithmetic decoding operations sequentially with respect to the first coordinate suffix syntax element and the second coordinate suffix syntax element in a second arithmetic decoding method; and restoring the first coordinate component by performing inverse binarization on the first coordinate prefix bit string and the first coordinate suffix bit string, and restoring the second coordinate component by performing inverse binarization on the second coordinate prefix bit string and the second coordinate suffix bit string.

According to another aspect of the present invention, there is provided a video decoding apparatus comprising: a parser acquiring a first coordinate prefix syntax element and a first coordinate suffix syntax element respectively corresponding to a first coordinate prefix bit string and a first coordinate suffix bit string that are obtained by classifying a first coordinate location of a last significant coefficient of a current block based on a critical value determined based on a size of the current block, and a second coordinate prefix syntax element and a second coordinate suffix syntax element respectively corresponding to a second coordinate prefix bit string and a second coordinate suffix bit string that are obtained by classifying a second coordinate location of the last significant coefficient based on the critical value, from a received bit stream; and an arithmetic decoder acquiring the first coordinate prefix bit string and the second coordinate prefix bit string by performing arithmetic decoding operations sequentially with respect to the first coordinate prefix syntax element and the second coordinate prefix syntax element in a first arithmetic decoding method, acquiring the first coordinate suffix bit string and the second coordinate suffix bit string by performing arithmetic decoding operations sequentially with respect to the first coordinate suffix syntax element and the second coordinate suffix syntax element in a second arithmetic decoding method, and restoring the first coordinate component by performing inverse binarization on the first coordinate prefix bit string and the first coordinate suffix bit string, and restoring the second coordinate component by performing inverse binarization on the second coordinate prefix bit string and the second coordinate suffix bit string.

According to another aspect of the present invention, there is provided an arithmetic encoding method for encoding a video, the method comprising: classifying a first coordinate component of a location of a last significant coefficient in a current block into a first coordinate prefix bit string and a first coordinate suffix bit string based on a critical value that is determined based on a size of the current block; classifying a second coordinate component of the location of the last significant coefficient into a second coordinate prefix bit string and a second coordinate suffix bit string based on the critical value; performing arithmetic encoding on the first coordinate prefix bit string and the second coordinate prefix bit string sequentially in a first arithmetic encoding method; and performing arithmetic encoding on the first coordinate suffix bit string and the second coordinate suffix bit string in a second arithmetic encoding method.

According to another aspect of the present invention, there is provided a video encoding apparatus comprising: an image encoder performing prediction, transformation, and quantization on blocks that are obtained by splitting video for generating syntax elements of the blocks; and an entropy encoder classifying a first coordinate component of a location of a last significant coefficient in a current block into a first coordinate prefix bit string and a first coordinate suffix bit string based on a critical value that is determined based on a size of the current block, classifying a second coordinate component of the location of the last significant coefficient into a second coordinate prefix bit string and a second coordinate suffix bit string based on the critical value, performing arithmetic encoding on the first coordinate prefix bit string and the second coordinate prefix bit string sequentially in a first arithmetic encoding method, and performing arithmetic encoding on the first coordinate suffix bit string and the second coordinate suffix bit string in a second arithmetic encoding method.

[Mode for Invention]

Hereinafter, embodiments of the present invention will be described in detail with reference to accompanying drawings. In the following description, the term 'image' may refer to a still image or a moving picture, that is, a video.

First, an arithmetic encoding method and a video encoding apparatus according to an embodiment of the present invention, and an arithmetic decoding method and a video decoding apparatus according to an embodiment of the present invention will be described with reference to FIGS. 1 through 10.

FIG. 1 is a block diagram of a video encoding apparatus 10 according to an embodiment of the present invention.

The video encoding apparatus 10 splits a picture from among a plurality of pictures configuring the video into data units of a hierarchical structure, and performs prediction, transformation, and quantization by using the data units of the hierarchical structure. As will be described later with reference to FIGS. 11 through 23, the data units of the hierarchical structure may be maximum coding units, coding units, prediction units, or transformation units. The prediction units and the transformation units used in a prediction process and a transformation process may be determined independently from other data units based on costs.

Since encoding is recursively performed on each of coding units having a hierarchical structure in each region of a maximum coding unit to determine an optimum coding unit, data units having a tree structure may be obtained. That is, the coding units having a tree structure, and prediction units and transformation units having a tree structure may be determined in each maximum coding unit. Hierarchical information representing configurations of the data units having the hierarchical structure and non-hierarchical information for decoding have to be transmitted to perform a decoding operation.

Information relating to the hierarchical structure is necessary to determine coding units having a tree structure, prediction units having a tree structure, and transformation units having a tree structure, which will be described below, and may include a size of the maximum coding unit, a coded depth, partition information of the prediction units, a slit flat representing whether the coding units are split, size information of the transformation units, and a transformation unit (TU) size flag representing whether the transformation units are split. Encoding information other than the hierarchical structure information may include prediction mode information of intra/inter prediction applied to each of the prediction units, motion vector information, prediction direction information, color component information applied to corresponding data units when a plurality of color components are used, and transformation coefficient information. Hereinafter, the hierarchical information and non-hierarchical information that are to be entropy encoded and decoded may be referred to as a syntax element or a symbol. In addition, for convenience of description, data units are referred to as blocks. The blocks correspond to prediction units or partitions during the prediction process, and correspond to transformation units during the transformation process.

Referring to FIG. 1, the video encoding apparatus 10 includes an image encoder 11 and a syntax element encoder 12.

The image encoder 11 performs operations such as prediction, transformation, and quantization of image blocks to generate syntax elements. In more detail, the image encoder 11 generates a prediction value through an intra prediction and an inter prediction in each of blocks, and generates a transformation coefficient by transforming and quantizing a residual that is a difference between an original block and the prediction value.

The syntax element encoder 12 performs arithmetic encoding of syntax elements regarding the transformation coefficient generated in each of the blocks and other various syntax elements generated in other encoding processes, to generate a bit stream. In particular, the syntax element encoder 12 of the present embodiment classifies a row location and a column location of a last significant coefficient that is scanned last according to a predetermined scanning order among the significant coefficients except for 0 in the block into prefixes and suffixes based on a critical value determined according to a width or a height of the current block, and arithmetically encodes bit strings that are obtained by performing binarization on the prefixes sequentially by applying a context model according to context adaptive binary arithmetic coding (CABAC) and arithmetically encodes bit strings that are obtained by performing binarization on the suffixes in a bypass mode after the CABAC is performed.

Figure 2:
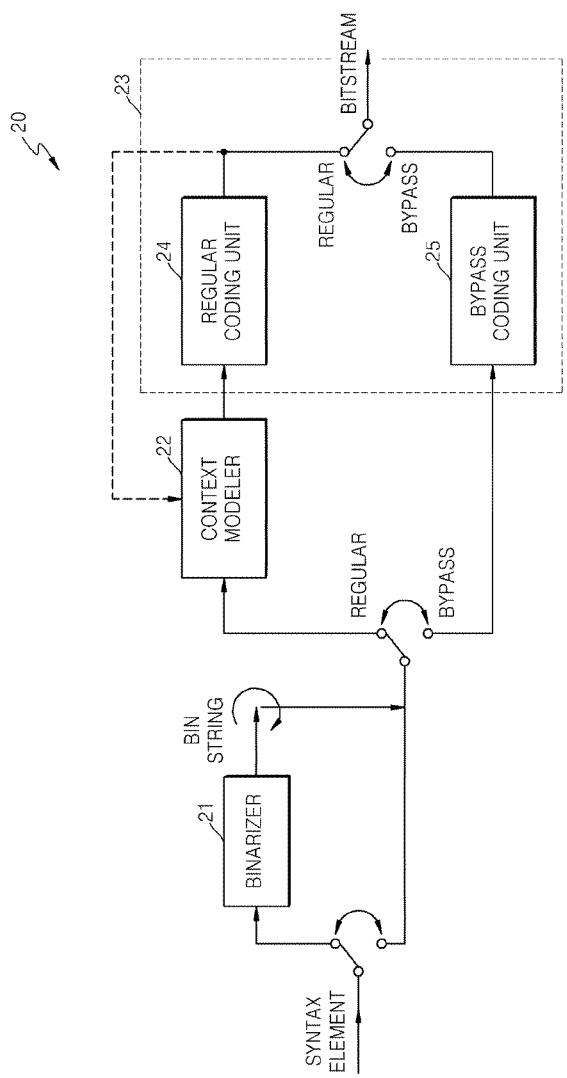
FIG. 2 is a block diagram of a syntax element coding unit shown in FIG. 1.

FIG. 2 is a block diagram showing the syntax element encoder 12 of FIG. 1 in more detail.

Referring to FIG. 2, a syntax element encoder 20 includes a binarizer 21, a context modeller 22, and a binary arithmetic coder 23. Also, the binary arithmetic coder 23 includes a regular coding engine 24 and a bypass coding engine 25.

If the syntax elements have not binary values, the binarizer 21 binarizes the syntax elements to output a bit string consisting of binary values of 0 or 1, that is, a bin string. A bin denotes each bit in the bit string consisting of 0 or 1. According to a type of the syntax element, one of unary binarization, truncated unary binarization, exponential Golomb binarization, and fixed length binarization may be used.

In particular, the binarizer 21 of the embodiment of the present invention classifies the currently encoded syntax element into a prefix or a suffix based on a critical value that is determined according to a size of the current block, and may binarize the prefix and the suffix by using binarization methods that are independent from each other to output a prefix bit string and a suffix bit string. For example, the binarizer 21 classifies a column location of the last significant coefficient into the prefix and the suffix based on a critical value that is determined based on a width of the current block, and then, outputs a prefix bit string of the column location by applying a predetermined first binarization method to the prefix of the column location and outputs a suffix bit string of the column location by applying a predetermined second binarization method to the suffix of the column location. The first binarization method and the second binarization method are independent from each other, that is, these may be the same as or different from each other.

Similarly, the binarizer 21 may classify a row location of the last significant coefficient into the prefix and the suffix based on a critical value that is determined based on a height of the current block, and then, output a prefix bit string of the row location by applying a predetermined first binarization method to the prefix of the row location and output a suffix bit string of the row location by applying a predetermined second binarization method to the suffix of the row location. A process of classifying the currently encoded syntax element into the prefix and the suffix will be described below with reference to FIG. 5.

According to the type of syntax element, each of the bins in the bit string may be arithmetically coded in the regular coding engine 24 by using the context model, or may be arithmetically coded in the bypass coding engine 25. In particular, when the location of the last significant coefficient is classified into the prefix bit string and the suffix bit string, the regular coding engine 24 of the present embodiment arithmetically encodes the bit strings classified as the prefixes by applying the context model according to the CABAC sequentially, and the bypass coding engine 25 may arithmetically encode the bit strings classified as the suffixes in the bypass mode.

The context modeler 22 provides the regular coding engine 24 with the context model for arithmetically encoding the current syntax element. In particular, the context modeler 22 outputs a probability of generating a binary value for encoding each of the bins in the prefix bit string to the regular coding engine 24, when the regular coding engine 24 arithmetically encodes the prefix bit string of the last significant coefficient location. The context model is a probability model of each bin, and includes information about which one of 0 and 1 corresponds to a most probable symbol (MPS) and a least probable symbol (LPS), and probability information of the MPS or LPS. The context modeler 22 updates the context model according to whether the value of the bit encoded in the regular coding engine 24 is 0 or 1.

The regular coding engine 24 performs arithmetic coding on each of bins configuring the prefix bit string of the last significant coefficient location based on the context model provided from the context modeler 22, that is, information about the MPS and the LPS and probability information of the MPS or LPS.

The bypass coding engine 25 performs the arithmetic coding of the suffix bit string of the last significant coefficient location according to the bypass mode. In the bypass mode, a probability of generating binary signals of 0 and 1 has a fixed value. Therefore, the bypass coding engine 25 may directly perform the arithmetic coding on the input bit string, unlike the arithmetic coding method using the context model, in which the context model is updated while arithmetically encoding each of the bins and the updated context model is used in the arithmetic coding of the next bin.

Figure 7:
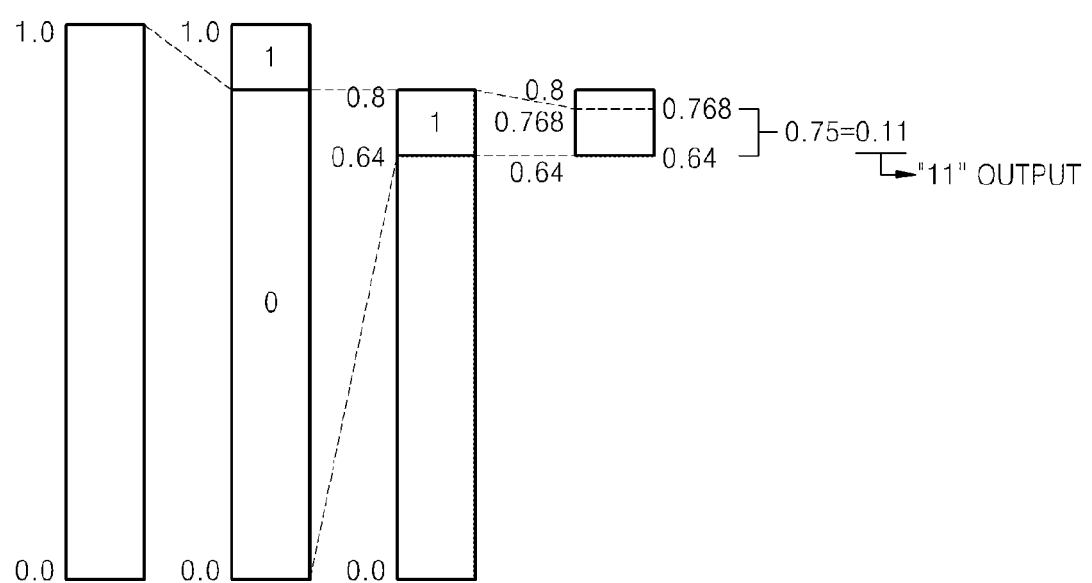
FIG. 7 is a diagram illustrating an arithmetic encoding process using a context model performed on a regular coding unit shown in FIG. 2.

FIG. 7 is a diagram illustrating the arithmetic coding processes using the context model performed in the regular coding engine 24 of FIG. 2. In FIG. 7, a binary value of the currently encoded symbol is "010", and it is assumed, for convenience of description, that the probability of generating 1 has a fixed value of 0.2 and the probability of generating 0 has a fixed value of 0.8. In actuality, the regular coding engine 24 updates the probability of generating the binary value according to the arithmetic coding of each of the bins in the binary value "010".

Referring to FIG. 7, when a first bin value "0" in the binary value of "010" is encoded, a lower 80% portion, that is, [0.0~0.8], in an initial section [0.0~1.0] is updated as a new section. In addition, when a next bin value "1" is encoded, an upper 20% portion, that is, [0.64~0.8], in the section [0.0~0.8] is updated as a new section. In addition, when a next bin value "0" is encoded, a lower 80% portion, that is, [0.64~0.768], in the section [0.6~40.8] is updated as a new section. In a binary number 0.11 corresponding to a real number 0.75 included in the final section [0.6~40.768], the number "11" below the decimal point except for the initial number 0 is output as a bit string corresponding to the binary value "010" of the encoded symbol.

Hereinafter, the arithmetic encoding and decoding processes of the information relating to the transformation coefficient, that is, syntax elements relating to the transformation coefficient, will be described in detail below.

Figure 3:
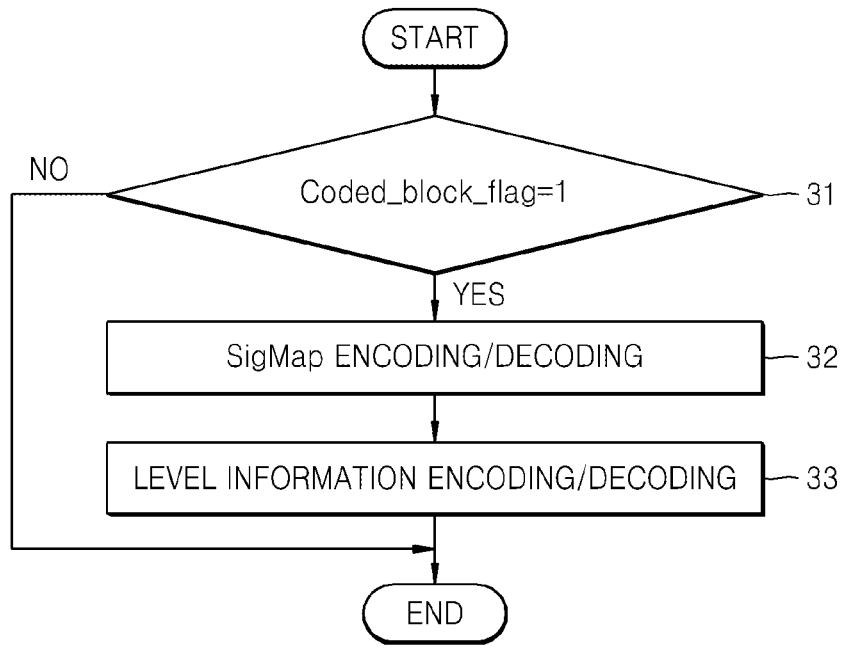
FIG. 3 is a flowchart illustrating processes of arithmetic encoding and decoding transformation coefficient information in each block, according to an embodiment of the present invention.

FIG. 3 is a flowchart illustrating processes of arithmetically encoding and decoding transformation coefficient information in each block, according to an embodiment of the present invention.

Referring to FIG. 3, in operation 31, a flag coded_block_flag representing whether there is a significant coefficient other than 0 among the transformation coefficients included in the current block is arithmetically encoded or decoded first.

If the current block only has transformation coefficients that are 0 and does not have a significant coefficient other than 0, a value 0 is arithmetically encoded as the coded_block_flag, and arithmetic encoding processes of the syntax elements relating to the other transformation coefficients are omitted.

In operation 32, if there is a significant coefficient in the current block, that is, a value of coded_block_flag is 1, a significance map (SigMap) indicating a location of the significant coefficient is arithmetically encoded or decoded.

The significance map SigMap may consist of predetermined information indicating a significant bit and a location of the last significant coefficient. The significant bit represents whether the transformation coefficient according to each scan index is the significant coefficient or 0, and may be expressed by using significant_coeff_flag[i]. The significance map SigMap may be set with respect to each of sub-sets having a predetermined size, which are obtained by splitting the current block. That is, significant_coeff_flag[i] may indicate whether the transformation coefficient of an i-th scan index among the transformation coefficients included in one sub-set of the current block is 0 or not.

In the conventional H.264 standard, a flag End-Of-Block that indicates whether the significant coefficient is the last significant coefficient is separately arithmetic encoded or decoded in each of the significant coefficients. However, according to the present embodiment, the information about the location of the last significant coefficient is arithmetically encoded or decoded as itself. For example, if the last significant coefficient is located at an x-th column (where x is an integer) and a y-th row (where y is an integer) of the current block, that is, if the location of the last significant coefficient is (x,y), values of x and y are arithmetically encoded or decoded.

In particular, the syntax element encoder 12 according to the present embodiment classifies a row location (x) of the last significant coefficient into an x-axis prefix bit string (or a first coordinate prefix bit string) and an x-axis suffix bit string (or a first coordinate suffix bit string) based on a critical value that is determined based on a width of the current block, and classifies a column location (y) of the last significant coefficient into an y-axis prefix bit string (or a second coordinate prefix bit string) and an y-axis suffix bit string (or a second coordinate suffix bit string) based on a critical value that is determined based on a height of the current block. In addition, the syntax element encoder 12 performs the arithmetic encoding of the x-axis and y-axis prefix bit strings by applying the context model according to the CABAC, and performs the arithmetic encoding on the x-axis and y-axis suffix bit strings in the bypass mode. Also, the syntax element encoder 12 may perform the arithmetic encoding sequentially by forming groups of the prefix bit strings and the suffix bit strings that are respectively encoded using different arithmetic encoding types. That is, the syntax element encoder 12 performs the arithmetic encoding on the x-axis prefix bit string and the y-axis prefix bit string by applying the context model, and may perform the arithmetic encoding on the x-axis suffix bit string and the y-axis suffix bit string in the bypass mode, after the arithmetic encoding performed on the prefix bit strings or independently from the arithmetic encoding process performed on the prefix bit strings.

Figure 4:
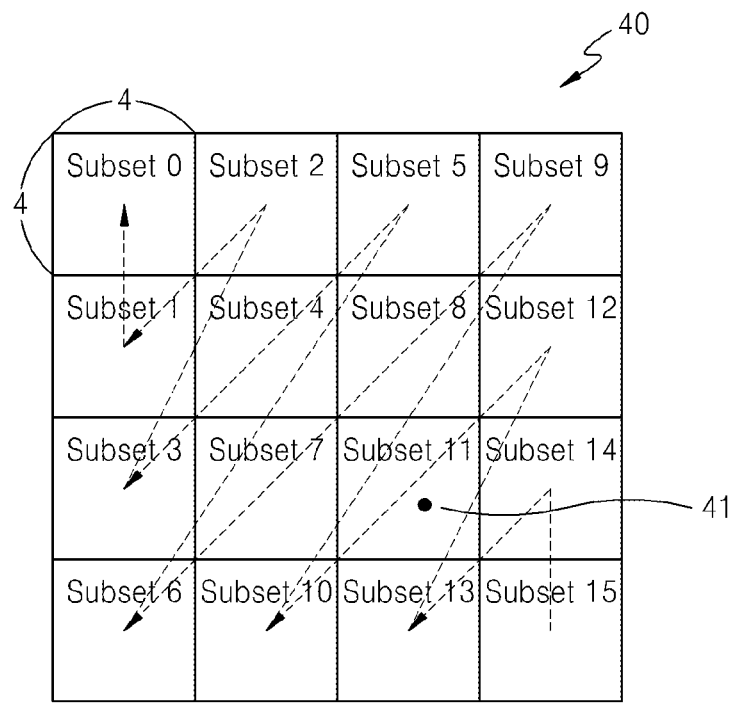
FIG. 4 is a diagram showing sub-sets obtained by dividing a block in order to perform arithmetic encoding on a syntax element relating to a transformation coefficient, according to an embodiment of the present invention.

FIG. 4 is a diagram showing sub-sets obtained by splitting the block in order to arithmetically encode syntax elements relating to the transformation coefficients. In FIG. 4, reference numeral 41 denotes the last significant coefficient in the block 40.

Referring to FIG. 4, in order to perform the arithmetic coding of the syntax elements relating to the transformation coefficients included in the block 40, the block 40 may be split into sub-sets having predetermined sizes. The transformation coefficient information may include a significance map (SigMap), a flag indicating whether the significant coefficient included in the sub-set is greater than 1 (Greaterthan1 flag), a flag indicating whether the significant coefficient included in the sub-set is greater than 2 (Greaterthan2 flag), information representing a level of the significant coefficients greater than 2 (level-3), and information about a location of the last significant coefficient 41. The syntax elements such as SigMap, Greaterthan1 flag, Greaterthan2 flag, and (level-3) may be arithmetically encoded in the sub-set unit. A processing order of the sub-sets may be variously set. For example, as denoted by arrows, the transformation coefficient information included in each of the sub-sets may be arithmetically encoded in an order from subset15 to subset0. The present invention is not limited thereto, and if a size of the block 40 is small, the block may not be split into the sub-sets, but syntax elements such as SigMap, Greaterthan1 flag, Greaterthan2 flag, and level-3 included in the block 40 may be arithmetically encoded.

As described above, among the significant coefficients included in the block 40, a row location (x) and a column location (y) of the last significant coefficient 41 according to a predetermined scanning order are respectively classified into a prefix bit string and a suffix bit string based on the size of the current block 40. Then, the prefix bit strings are arithmetically encoded by applying the context model according to the CABAC and the suffix bit strings are arithmetically encoded in the bypass mode.

Hereinafter, processes of classifying the location of the last significant coefficient into the prefix bit string and the suffix bit string will be described in more detail below.

Figure 5:
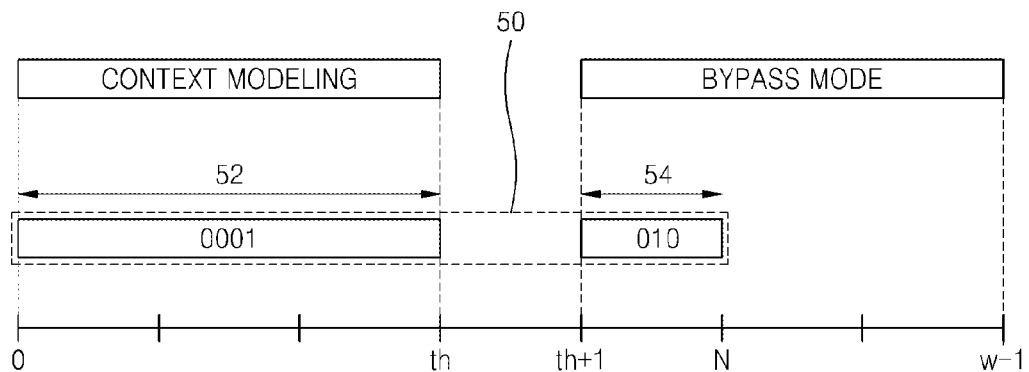
FIG. 5 is a reference diagram illustrating a process of arithmetic encoding a location of a last significant coefficient by classifying the location into a prefix bit string and a suffix bit string according to an embodiment of the present invention.

FIG. 5 is a referential diagram illustrating processes of classifying the location of the last significant coefficient into the prefix bit string and the suffix bit string, and arithmetically encoding the bit strings.

When it is assumed that a width of the block is w (where w is an integer) and a height of the block is h (where h is an integer), a location of the transformation coefficient in the block has a two-dimensional coordinate value (x, y). When it is defined that a location of the transformation coefficient is at a left uppermost corner of the block is (0,0) and a location of the transformation coefficient is at a right lowermost corner of the block (w−1), (h−1)), the row location x of the transformation coefficient in the block has one of values from 0 to (w−1) and the column location y of the transformation coefficient has one of values from 0 to (h−1).

First, processes of classifying the row location x into the prefix bit string and the suffix bit string and arithmetically encoding the bit strings will be described below.

Referring to FIG. 5, the row location x of the last significant coefficient in the block may have a value from among 0 to (w−1). Based on a critical value th determined based on the width w of the block, the row location x is classified into a prefix that is equal to or less than the critical value th and a suffix (x-th) exceeding the critical value th.

In particular, if the value of the row location x of the last significant coefficient is equal to or less than the critical value th, the row location is only classified as the prefix, and not classified as the suffix. If the value of the row location x exceeds the critical value th, the row location x is classified into the prefix corresponding to the critical value th and the suffix (x-th) exceeding the critical value th. That is, if the row location x has a value that is equal to or less than the critical value th, the row location is only classified as the prefix and there is no suffix. In addition, only when the row location x exceeds the critical value th, is the row location x classified into the prefix and the suffix.

In other words, if the row location x of the last significant coefficient is equal to or less than the critical value th, the row location x is binarized according to a predetermined first binarization method and classified only as the x-axis prefix bit string. If the row location x of the last significant coefficient x exceeds the critical value th, the row location x is classified into the x-axis prefix bit string that is obtained by performing binarization on the critical value th in the first binarization method and the x-axis suffix bit string that is obtained by performing binarization on the value (x-th) in a predetermined second binarization method.

The critical value th, based on which the row location x is classified into the prefix and the suffix, may be determined based on the width w of the block, as described above. For example, the critical value th may be (w/2)−1 that is an intermediate value between 0 to (w−1) that is an allowable range of the row location x. As another example, if the width w of the block is a power of 2, the critical value th may be determined by the following equation th=$(\log_2 w \ll 1)-1$. The critical value th is not limited thereto, and may be set in various ways.

In particular, if the width w of the block has a value of 8, the critical value th is (8/2)−1=3, and thus, the row location x may be classified into the prefix and the suffix based on the value of 3. If the row location x exceeds 3, for example, the row location x has a value of 5, since x=th+2=3+2, the row location x is classified into the prefix having a value of 3 and the suffix having a value of 2. If the row location x has a value of 3 or less, the row location x is directly binarized and classified as the prefix, and there is no suffix.

In the previously described example, the prefix 3 and the suffix 2 are respectively binarized using different binarization methods. For example, the prefix may be binarized through a truncated unary binarization process, and the suffix may be binarized through a fixed length binarization process. For convenience of description, in FIG. 5, in a case where the row location x is 5 and the critical value th is 3, the value of 3 that is classified as the prefix is binarized into 0001 (52) through unary binarization, and the value of 2 that is classified as the suffix is binarized into 010 (54) through a general binarization process.

As described above, the prefix bit string 0001 (52) is arithmetically encoded by applying the context model. The context index is determined with respect to each of the bins in '0001', and the context model for arithmetically encoding each bin may be determined based on the determined context index. The suffix bit string 010 (54) is arithmetically encoded in the bypass mode without performing the process of determining the context modelling. In the bypass mode, since each of the bins has the same probability, that is, the value of 0 and the value of 1 have the same fixed probability value of ½, the input bit string 101 (54) may be directly arithmetically encoded without using the context model.

As described above, if the row location x has the value that is equal to or less than the critical value th, the row location x is only classified as the prefix, and there is no suffix. In the above described example, it is assumed that the row location x has a value of 1 that is less than the critical value th of 3. In this case, the value of the row location x, that is, 1, is only classified into the prefix bit string through a predetermined binarization method, and there is no suffix bit string. As described above, the prefix bit strings are arithmetically encoded by applying the context model, and the arithmetic encoding process in the bypass mode is omitted because there is no suffix bit string.

Similarly to the arithmetic encoding performed after classifying the row location x into the prefix bit string and the suffix bit string, the column location y may be classified into the prefix bit string and the suffix bit string and may be arithmetically encoded. That is, based on a critical value th determined based on the height h of the block, the column location y is classified into the prefix that is equal to or less than the critical value th and the suffix having a value of (y-th) that exceeds the critical value th. If the column location y has a value that is equal to or less than the critical value th, the column location is only classified into the prefix, and there is no suffix. If the column location y is classified into the prefix and the suffix, each of the prefix and the suffix is binarized using an independent binarization method, thereby obtaining a prefix bit string and a suffix bit string.

That is, the column location y of the last significant coefficient is equal to or less than the critical value th, the column location y is binarized using a first binarization method and classified into the y-axis prefix bit string. If the column location y of the last significant coefficient exceeds the critical value th, the column location y is classified into the y-axis prefix bit string that is obtained by performing binarization on the critical value th in the first binarization method and a y-axis suffix bit string that is obtained by performing binarization on the value of (y-th) in a second binarization method.

In addition, the prefix bit string is arithmetically encoded by applying the context model, and the suffix bit string is arithmetically encoded in the bypass mode.

Figure 6:
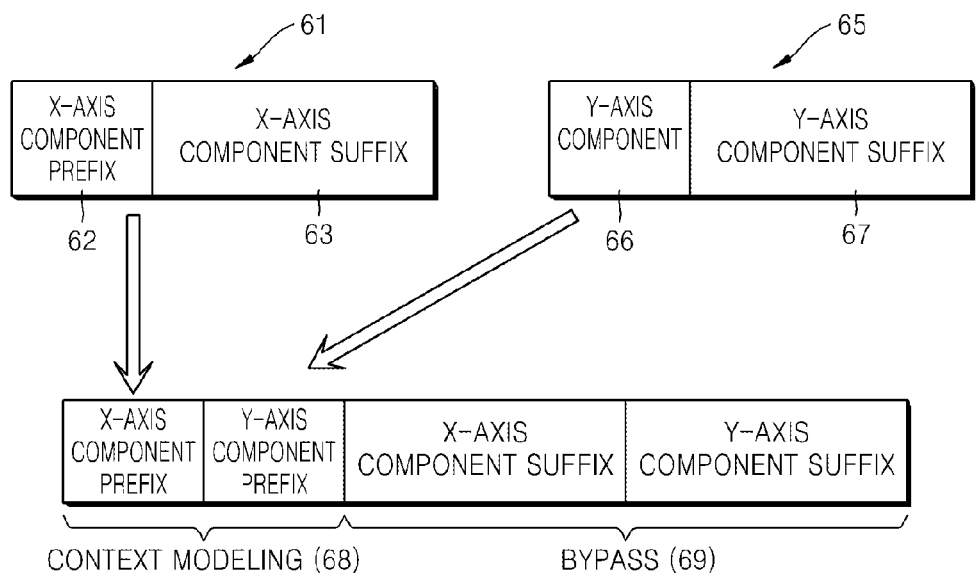
FIG. 6 is a diagram illustrating a process of arithmetically encoding location information of the last significant coefficient according to an embodiment of the present invention.

FIG. 6 is a diagram illustrating a process of arithmetically encoding the location information of the last significant coefficient, according to an embodiment of the present invention.

As described above, when the row location x and the column location y of the last significant coefficient are respectively classified into the prefix bit strings and the suffix bit strings based on the critical value th that is determined based on the size of the current block, the syntax element encoder 12 according to the present embodiment performs the arithmetic coding of the prefix bit strings by applying the context model according to the CABAC and performs the arithmetic coding of the bit strings classified as the suffix in the bypass mode.

Referring to FIG. 6, when the row location x 61 of the last significant coefficient is classified into an x-axis component prefix 62 and an x-axis component suffix 63 and the column location y is classified into a y-axis component prefix 66 and a y-axis component suffix 67, the syntax element encoder 12 makes a group of the x-axis component prefix 62 and the y-axis component prefix 66 and performs the arithmetic encoding on the group by applying the context modelling 68. In addition, after performing the context modelling 68 or independently from the context modelling 68, the syntax element encoder 12 makes a group of the x-axis component suffix 63 and the y-axis component suffix 67 and performs the arithmetic encoding on the group in the bypass mode 69. As described above, the syntax element encoder 12 of the present embodiment may perform the process with respect to groups of the bit strings to which the same arithmetic encoding method is applied, and thus, calculation speed may be improved. In particular, the x-axis component suffix 63 and the y-axis component suffix 67 are grouped and the arithmetic encoding of the group is performed in the bypass mode, and thus, the suffix bit strings may be arithmetically encoded instantly. Since the bypass mode uses the fixed probability value as described above, encoding results corresponding to the entire input bit strings may be directly output. In addition, as described above, when the row location x or the column location y of the last significant coefficient has a value that is equal to or less than the predetermined critical value, the suffix bit strings of the row and column locations do not exist, and thus, the arithmetic encoding process of the suffix bit strings may be omitted.

Figure 8:
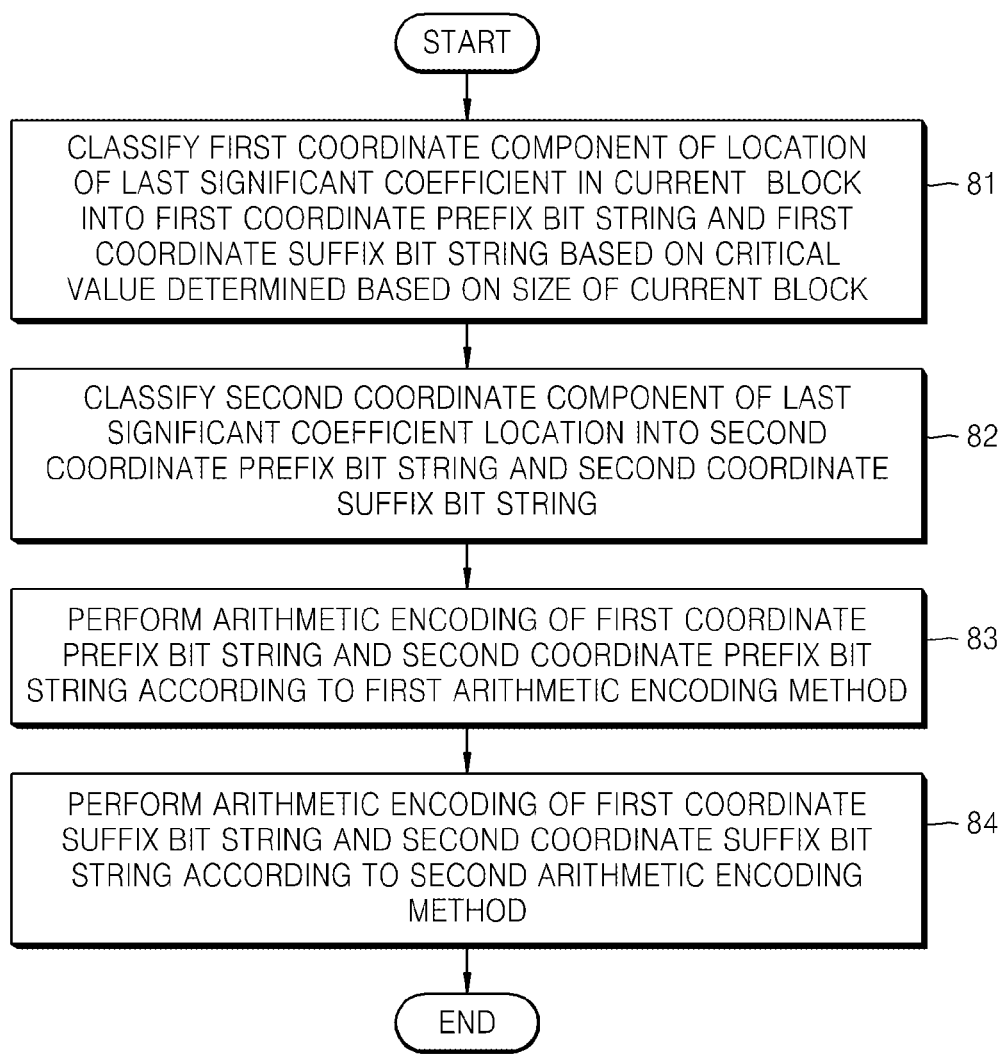
FIG. 8 is a flowchart illustrating an arithmetic encoding method for encoding video, according to an embodiment of the present invention.

FIG. 8 is a flowchart illustrating an arithmetic encoding method for encoding video, according to an embodiment of the present invention.

Referring to FIG. 8, in operation 82, the syntax element encoder 12 classifies a first coordinate component of the last significant coefficient location in the current block into a first coordinate prefix bit string and a first coordinate suffix bit string based on a critical value that is determined based on a size of the current block. As described above, the syntax element encoder 12 binarizes the row location x according to a first predetermined binarization method and classifies a result of the binarization as the x-axis prefix bit string when the row location x of the last significant coefficient is equal to or less than the critical value th. Also, when the row location x of the last significant coefficient exceeds the critical value th, the syntax element encoder 12 classifies the row location x into the x-axis prefix bit string that is obtained by performing binarization on the critical value th according to the first binarization method and the x-axis suffix bit string that is obtained by performing binarization on a value of (x-th) according to a second predetermined binarization method.

In operation 82, the syntax element encoder 12 classifies a second coordinate component of the last significant coefficient into a second coordinate prefix bit string and a second coordinate suffix bit string based on the critical value. As described above, the syntax element encoder 12 binarizes the column location y according to a first predetermined binarization method and classifies a result of the binarization as the y-axis prefix bit string when the column location y of the last significant coefficient is equal to or less than the critical value th. Also, when the column location y of the last significant coefficient exceeds the critical value th, the syntax element encoder 12 classifies the column location y into the y-axis prefix bit string that is obtained by performing binarization on the critical value th according to the first binarization method and the y-axis suffix bit string that is obtained by performing binarization on a value of (y-th) according to a second predetermined binarization method. Here, when the width w and the height h of the block are equal to each other, the critical values that are criteria for classifying the row location x and the column location y into the prefixes and the suffixes are equal to each other. If the block has a rectangular shape, the critical values for classifying the row location x and the column location y into the prefixes and the suffixes may be determined respectively based on the width and the height of the block.

In operation 83, the syntax element encoder 12 sequentially performs the arithmetic encoding on the first coordinate prefix bit strings and the second coordinate prefix bit strings according to a first arithmetic encoding method. As described above, the syntax element encoder 12 may make a group of the prefix bit strings to perform the arithmetic encoding by using the context model.

In operation 84, the syntax element encoder 12 performs the arithmetic encoding on the first coordinate suffix bit strings and the second coordinate suffix bit strings according to a second arithmetic encoding method. As described above, the syntax element encoder 12 may make a group of the suffix bit strings that are arithmetically encoded in the bypass model.

Figure 9A:
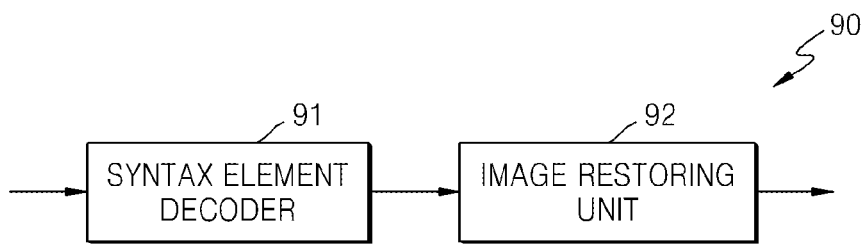
FIG. 9A is a block diagram showing a video encoding apparatus according to an embodiment of the present invention.

FIG. 9A is a block diagram of a video decoding apparatus 90 according to an embodiment of the present invention.

Referring to FIG. 9A, the video decoding apparatus includes a syntax element decoder 91 and an image restoring unit 92.

The syntax element decoder 91 receives a bit stream including various syntax elements representing encoded data of the video, and parses the bit stream to acquire the syntax elements. The above operations may be performed in a parsing unit of the syntax element decoder 91. Since the syntax elements are binarized and arithmetically encoded by the above described video encoding apparatus 10, the syntax element decoder 91 restores the syntax elements through arithmetically decoding and inverse-binarization processes.

In particular, the syntax element decoder 91 of the present embodiment acquires an x-axis component prefix syntax element and an x-axis component suffix syntax element respectively corresponding to the x-axis component prefix bit string and the x-axis component suffix bit string that are obtained by classifying the x-axis location of the last significant coefficient of the current block based on the critical value determined based on the size of the current block, and a y-axis component prefix syntax element and a y-axis component suffix syntax element respectively corresponding to the y-axis component prefix bit string and the y-axis component suffix bit string that are obtained by classifying the y-axis location of the last significant coefficient based on the critical value, from the received bit stream.

In addition, the syntax element decoder 91 performs arithmetic decoding operations sequentially with respect to the x-axis component prefix syntax element and the y-axis component prefix syntax element in a first arithmetic decoding method, that is, the arithmetic decoding using the context model, in order to acquire the x-axis component prefix bit string and the y-axis component prefix bit string.

Also, the syntax element decoder 91 performs arithmetic decoding operations sequentially with respect to the x-axis component suffix syntax element and the y-axis component suffix syntax element in a second arithmetic decoding method, that is, the arithmetic decoding of the bypass mode, in order to acquire the x-axis component suffix bit string and the y-axis component suffix bit string. As described above, since there is no suffix in a case where the value of the row location x and the column location y is less than the predetermined critical value th, the arithmetic decoding operation of the suffix syntax element is omitted in this case.

When the x-axis component prefix bit string, the y-axis component prefix bit string, the x-axis component suffix bit string, and the y-axis component suffix bit string are acquired, the syntax element decoder performs inverse binarization on the x-axis component prefix bit string and the x-axis component suffix bit string, and adds the inversely binarized x-axis component prefix and the x-axis component suffix to recover the x-axis component. Also, the syntax element decoder 91 performs inverse binarization on the y-axis component prefix bit string and the y-axis component suffix bit string, and adds the inversely binarized y-axis component prefix and the y-axis component suffix to recover the y-axis component.

The image restoring unit 92 performs inverse transformation and prediction on the current block by using various syntax elements restored by the syntax element decoder 91. The image restoring unit 92 may restore the image blocks by performing operations such as inverse quantization, inverse transformation, and intra prediction/motion compensation by using the restored syntax elements in each of the image blocks.

Figure 9B:
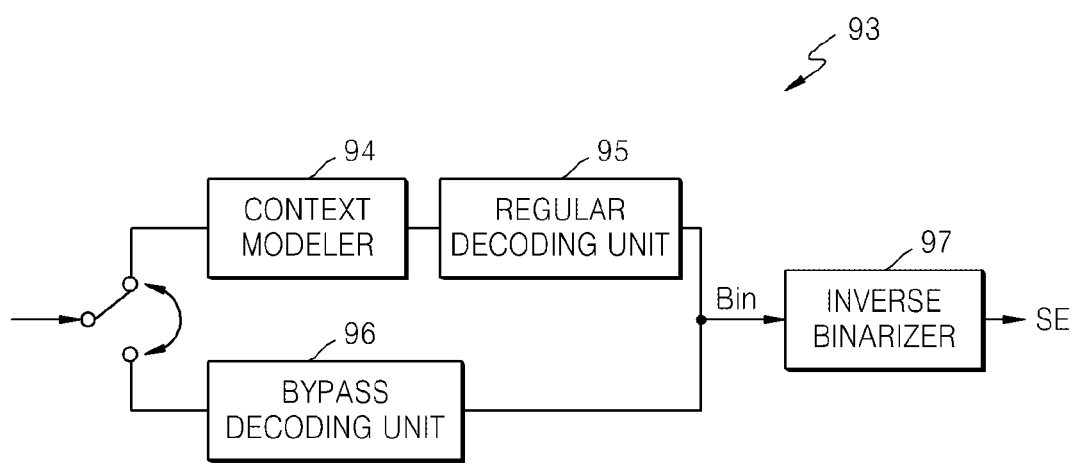
FIG. 9B is a block diagram showing an arithmetic decoding apparatus included in a syntax element decoding unit of FIG. 9A.

FIG. 9B is a block diagram of an arithmetic decoding apparatus included in the syntax element decoder 91 of FIG. 9A. The arithmetic decoding apparatus 93 shown in FIG. 9B corresponds to the syntax element encoding apparatus 20 shown in FIG. 2. The arithmetic decoding apparatus 93 performs processes that are the inverse of the arithmetic encoding processes performed in the syntax element encoding apparatus 20.

Referring to FIG. 9B, the arithmetic decoding apparatus 93 includes a context modeller 94, a regular decoder 95, a bypass decoder 95, and an inverse binarization unit 97.

Symbols encoded in the bypass mode are output to the bypass decoder 96 to be decoded, and symbols encoded in a regular coding method are decoded by the regular decoder 95. The regular decoder 95 arithmetically decodes a binarization value of the currently encoded symbol based on a context model provided from the context modeller 94. As described above, the regular decoder 95 performs the arithmetic decoding using the context model sequentially with respect to the x-axis component prefix syntax element and the y-axis component prefix syntax element acquired from the received bit stream, and thus, acquires the x-axis component prefix bit string and the y-axis component prefix bit string.

The bypass decoder 96 performs the arithmetic decoding in the bypass mode with respect to the x-axis component suffix syntax element and the y-axis component suffix syntax element acquired from the received bit stream, and thus, acquires the x-axis component suffix bit string and the y-axis component suffix bit string.

The inverse binarization unit 97 performs inverse binarization on the x-axis component prefix bit string, the y-axis component prefix bit string, the x-axis component suffix bit string, and the y-axis component suffix bit string recovered by the regular decoder 95 or the bypass decoder 96 in order to restore the x-axis component prefix, the y-axis component prefix, the x-axis component suffix, and the y-axis component suffix. The x-axis component prefix and the x-axis component suffix are added to obtain the x-axis location of the last significant coefficient and the y-axis component prefix and the y-axis component suffix are added to obtain the y-axis location of the last significant coefficient.

Figure 10:
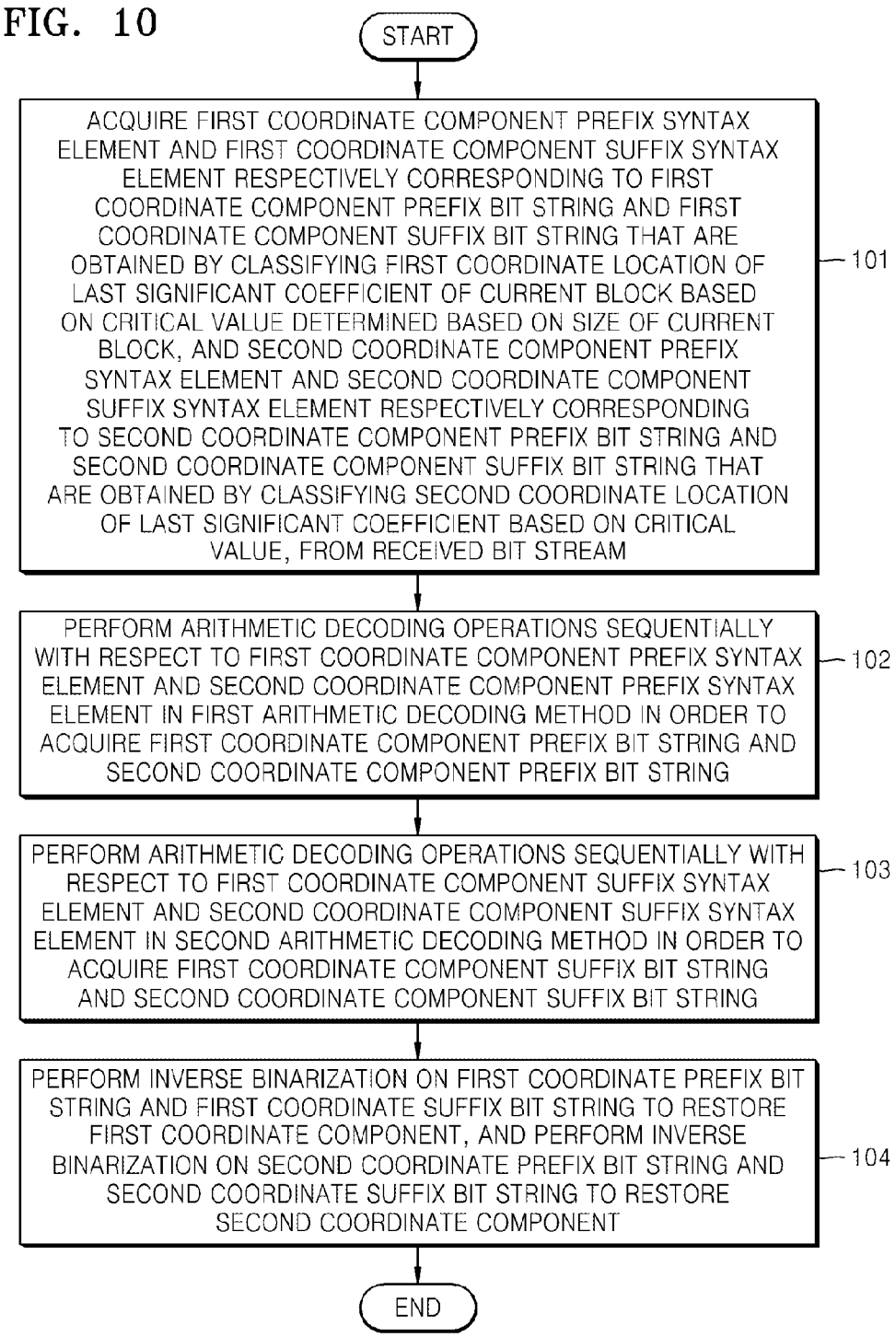
FIG. 10 is a flowchart illustrating an arithmetic decoding method for decoding video, according to an embodiment of the present invention.

FIG. 10 is a flowchart illustrating an arithmetic decoding method for decoding video, according to an embodiment of the present invention.

Referring to FIG. 10, in operation 101, the syntax element decoder 91 acquires a first coordinate component prefix syntax element and a first coordinate component suffix syntax element respectively corresponding to the first coordinate component prefix bit string and the first coordinate component suffix bit string that are obtained by classifying the first coordinate location of the last significant coefficient of the current block based on the critical value determined based on the size of the current block, and a second coordinate component prefix syntax element and a second coordinate component suffix syntax element respectively corresponding to the second coordinate component prefix bit string and the second coordinate component suffix bit string that are obtained by classifying the second coordinate location of the last significant coefficient based on the critical value, from the received bit stream.

In operation 102, the syntax element decoder 91 performs arithmetic decoding operations sequentially with respect to the first coordinate component prefix syntax element and the second coordinate component prefix syntax element in a first arithmetic decoding method, that is, the arithmetic decoding using the context model, in order to acquire the first coordinate component prefix bit string and the second coordinate component prefix bit string.

In operation 103, the syntax element decoder 91 performs arithmetic decoding operations sequentially with respect to the first coordinate component suffix syntax element and the second coordinate component suffix syntax element in a second arithmetic decoding method, that is, the arithmetic decoding of the bypass mode, in order to acquire the first coordinate component suffix bit string and the second coordinate component suffix bit string.

In operation 104, the syntax element decoder 91 performs inverse binarization on the first coordinate prefix bit string and the first coordinate suffix bit string to restore the first coordinate component, and performs inverse binarization on the second coordinate prefix bit string and the second coordinate suffix bit string to restore the second coordinate component.

According to the above embodiment of the present invention, the location of the last significant coefficient is classified into the prefix bit strings and the suffix bit strings, and the bit strings to which the same arithmetic encoding method is applied are configured as a group to be processed sequentially. The prefix bit strings are arithmetically encoded and decoded by using the context modelling, and the suffix bit strings are arithmetically encoded and decoded in the bypass mode without using the context modelling. Thus, a calculation amount is reduced when compared with a case where the location of the last significant coefficient is arithmetically encoded and decoded by using the context modelling only, and thus, processing speed of the arithmetic encoding and decoding operations may be improved.

As described above, in the video encoding apparatus 10 and the video decoding apparatus 90 according to the present embodiment, the blocks obtained by splitting the video data are split into coding units having a tree structure, and prediction units are used to predict the coding units and transformation units are used to transform the coding units. Hereinafter, a video encoding method and apparatus and a video decoding method and apparatus based on the coding units, the prediction units, and the transformation units having tree structures will be described with reference to FIGS. 11 through 23 below.

Figure 11:
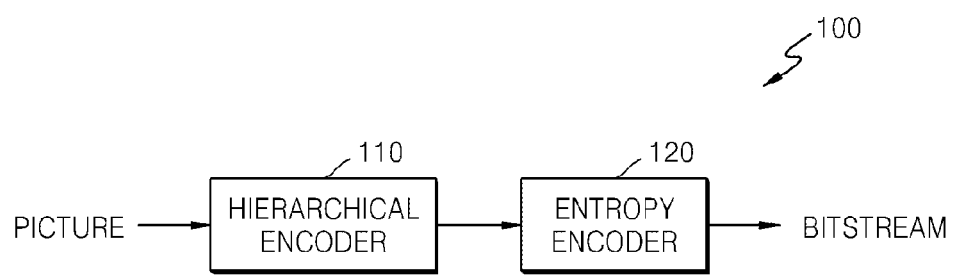
FIG. 11 is a block diagram of a video encoding apparatus according to an embodiment of the present invention.

FIG. 11 is a block diagram of a video encoding apparatus 100 according to an embodiment of the present invention.

The video encoding apparatus 100 includes a hierarchical encoder 110 and an entropy encoder 120.

The hierarchical encoder 110 splits a current picture that is encoded into data units of predetermined sizes to perform an encoding operation in each of the data units. In particular, the hierarchical encoder 110 may split a current picture based on a maximum coding unit that is a coding unit of a largest size. The maximum coding unit according to an embodiment of the present invention may be a data unit having a size of 32×32, 64×64, 128×128, 256×256, etc., wherein a shape of the data unit is a square having a width and length in squares of 2.

A coding unit according to an embodiment of the present invention may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an embodiment of the present invention is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The hierarchical encoder 110 encodes at least one split region obtained by splitting a region of the maximum coding unit according to depths, and determines a depth to output finally encoded image data according to the at least one split region. In other words, the hierarchical encoder 110 determines a coded depth by encoding the image data in the deeper coding units according to depths, according to the maximum coding unit of the current picture, and selecting a depth having the least encoding error. The determined coded depth and the encoded image data according to the determined coded depth are output to the entropy encoder 120.

The image data in the maximum coding unit is encoded based on the deeper coding units corresponding to at least one depth equal to or smaller than the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to a same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split into regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the hierarchical encoder 110 may determine coding units having a tree structure included in the maximum coding unit. The 'coding units having a tree structure' according to an embodiment of the present invention include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an embodiment of the present invention is an index related to the number of times splitting is performed from a maximum coding unit to a minimum coding unit. A first maximum depth according to an embodiment of the present invention may denote the total number of times splitting is performed from the maximum coding unit to the minimum coding unit. A second maximum depth according to an embodiment of the present invention may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transformation unit'. Similarly to the coding unit, the transformation unit in the coding unit may be recursively split into smaller sized regions, so that the transformation unit may be determined independently in units of regions. Thus, residual data in the coding unit may be divided according to the transformation unit having the tree structure according to transformation depths.

A transformation depth indicating the number of times splitting is performed to reach the transformation unit by splitting the height and width of the coding unit may also be set in the transformation unit. For example, in a current coding unit of 2N×2N, a transformation depth may be 0 when the size of a transformation unit is 2N×2N, may be 11 when the size of a transformation unit is N×N, and may be 12 when the size of a transformation unit is N/2×N/2. That is, the transformation unit having the tree structure may also be set according to transformation depths.

Encoding information according to coding units corresponding to a coded depth requires not only information about the coded depth, but also about information related to prediction encoding and transformation. Accordingly, the hierarchical encoder 110 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a partition, according to embodiments of the present invention, will be described in detail later.

The hierarchical encoder 110 may measure an encoding error of deeper coding units according to depths by using Rate-Distortion Optimization based on Lagrangian multipliers.

The entropy encoder 120 outputs the image data of the maximum coding unit, which is encoded based on the at least one coded depth determined by the hierarchical encoder 110, and information about the encoding mode according to the coded depth, in bitstreams. The encoded image data may be obtained by encoding residual data of an image. The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the entropy encoder 120 may assign encoding information about a corresponding coded depth and an encoding mode to at least one of the coding unit, the prediction unit, and a minimum unit included in the maximum coding unit.

The minimum unit according to an embodiment of the present invention is a square data unit obtained by splitting the minimum coding unit constituting the lowermost depth by 4. Alternatively, the minimum unit may be a maximum square data unit that may be included in all of the coding units, prediction units, partition units, and transformation units included in the maximum coding unit.

For example, the encoding information output through the entropy encoder 120 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into a header of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum number of 4 coding units of the lower depth having the size of N×N.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or a large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 12:
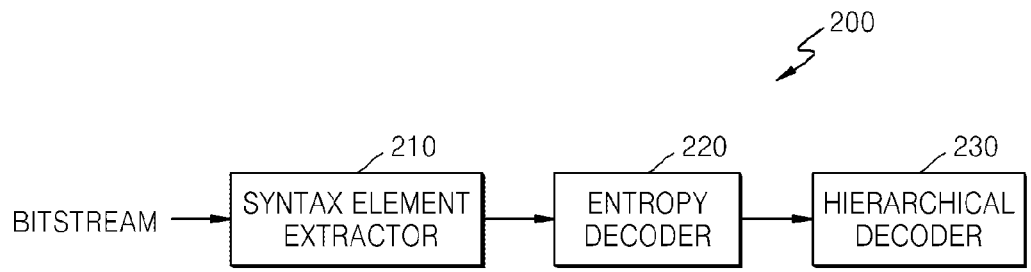
FIG. 12 is a block diagram of a video decoding apparatus according to an embodiment of the present invention.
Figure 13:
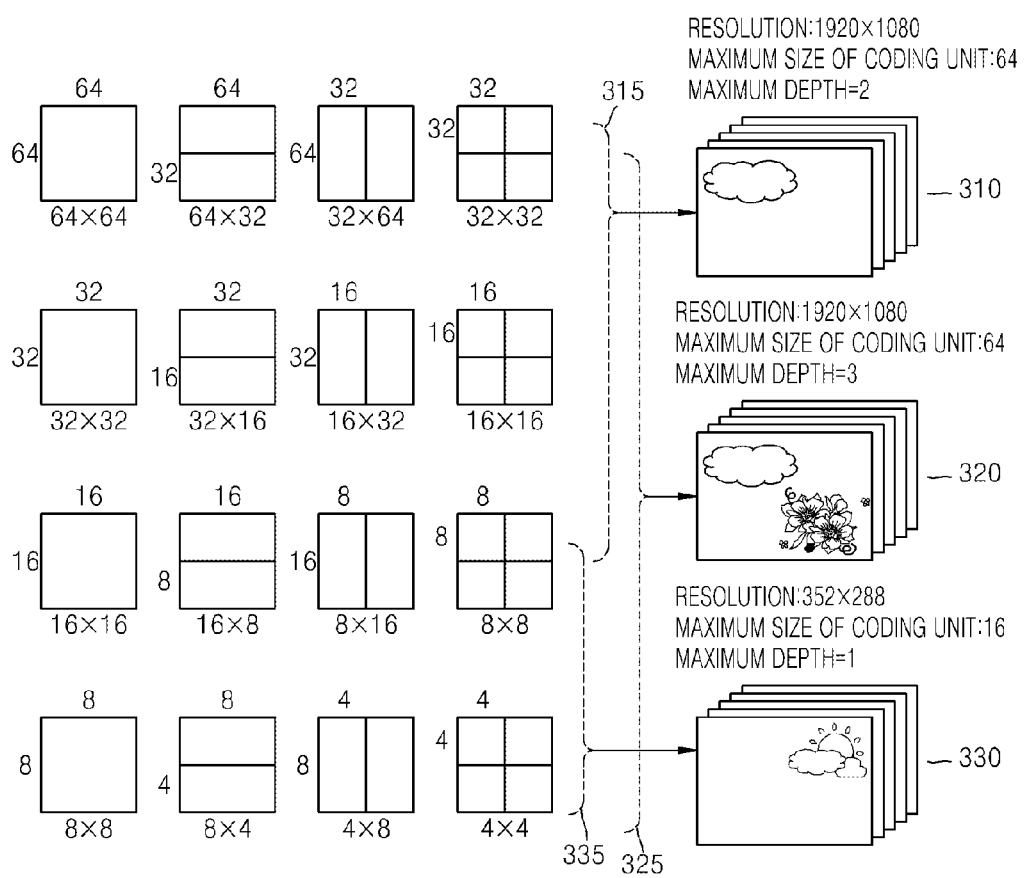
FIG. 13 is a diagram showing a concept of a coding unit according to an embodiment of the present invention.

FIG. 12 is a block diagram of a video decoding apparatus 200, according to an embodiment of the present invention.

The video decoding apparatus 200 includes a syntax element extractor 210, an entropy decoder 220, and a hierarchical decoder 230. Definitions of various terms, such as a coding unit, a depth, a prediction unit, a transformation unit, and information about various encoding modes, for various operations of the video decoding apparatus 200 are identical to those described with reference to FIG. 11 and the video encoding apparatus 100.

The syntax element extractor 210 receives and parses a bitstream of an encoded video. The entropy decoder 220 extracts encoded image data for each coding unit from the parsed bitstream, wherein the coding units have a tree structure according to each maximum coding unit, and outputs the extracted image data to the hierarchical decoder 230.

Also, the entropy decoder 220 extracts additional information about a coded depth, an encoding mode, color component information, and prediction mode information for the coding units having a tree structure according to each maximum coding unit, from the parsed bitstream. The extracted information about the coded depth and the encoding mode is output to the hierarchical decoder 230. In other words, the image data in a bit stream is split into the maximum coding unit so that the hierarchical decoder 230 decodes the image data for each maximum coding unit.

The information about the coded depth and the encoding mode according to the maximum coding unit extracted by the entropy decoder 220 may be set for information about the coded depth and the encoding mode that are determined to generate minimum encoding error by performing the encoding repeatedly in each of coding units according to the maximum coding unit and the coded depth at an encoding terminal, like the video encoding apparatus 100 of the embodiment. Therefore, the video decoding apparatus 200 may restore the image by decoding the data according to the encoding method generating the minimum encoding error.

Since encoding information about the coded depth and the encoding mode may be assigned to a predetermined data unit from among a corresponding coding unit, a prediction unit, and a minimum unit, the entropy decoder 220 may extract the information about the coded depth and the encoding mode according to the predetermined data units. If the information about the coded depth and the encoding mode of the corresponding maximum coding unit is recorded in each of predetermined data units, the predetermined data units to which the same information about the coded depth and the encoding mode is assigned may be inferred to be the data units included in the same maximum coding unit.

The hierarchical decoder 230 restores the current picture by decoding the image data in each maximum coding unit based on the information about the coded depth and the encoding mode according to the maximum coding units. In other words, the hierarchical decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse transformation. Inverse transformation may be performed according to a method of inverse orthogonal transformation or inverse integer transformation.

The hierarchical decoder 230 may perform intra prediction or motion compensation according to a partition and a prediction mode of each coding unit, based on the information about the partition type and the prediction mode of the prediction unit of the coding unit according to coded depths.

Also, the hierarchical decoder 230 may perform inverse transformation according to each transformation unit in the coding unit, based on the information about the size of the transformation unit of the coding unit according to coded depths, so as to perform the inverse transformation according to maximum coding units.

The hierarchical decoder 230 may determine at least one coded depth of a current maximum coding unit by using split information according to depths. If the split information indicates that image data is no longer split in the current depth, the current depth is a coded depth. Accordingly, the hierarchical decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the hierarchical decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an embodiment of the present invention, will now be described with reference to FIGS. 13 through 23.

FIG. 3 is a diagram for describing a concept of coding units according to an embodiment of the present invention.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 13 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 14:
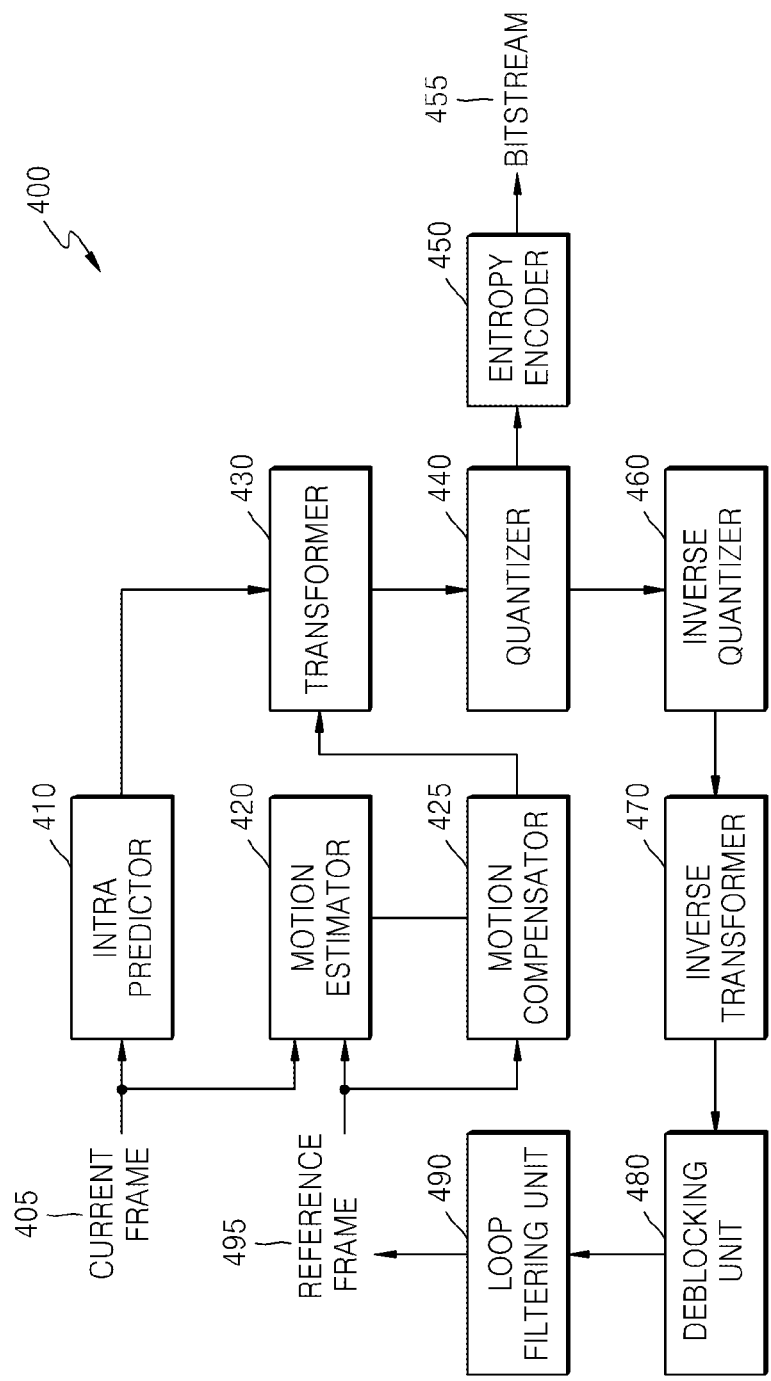
FIG. 14 is a block diagram of a video encoding apparatus based on hierarchical coding units according to an embodiment of the present invention.

FIG. 14 is a block diagram of an image encoding apparatus based on coding units of a hierarchical structure, according to an embodiment of the present invention.

An intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, an inverse quantizer 460, an inverse transformer 470, a deblocking unit 480, and a loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 15:
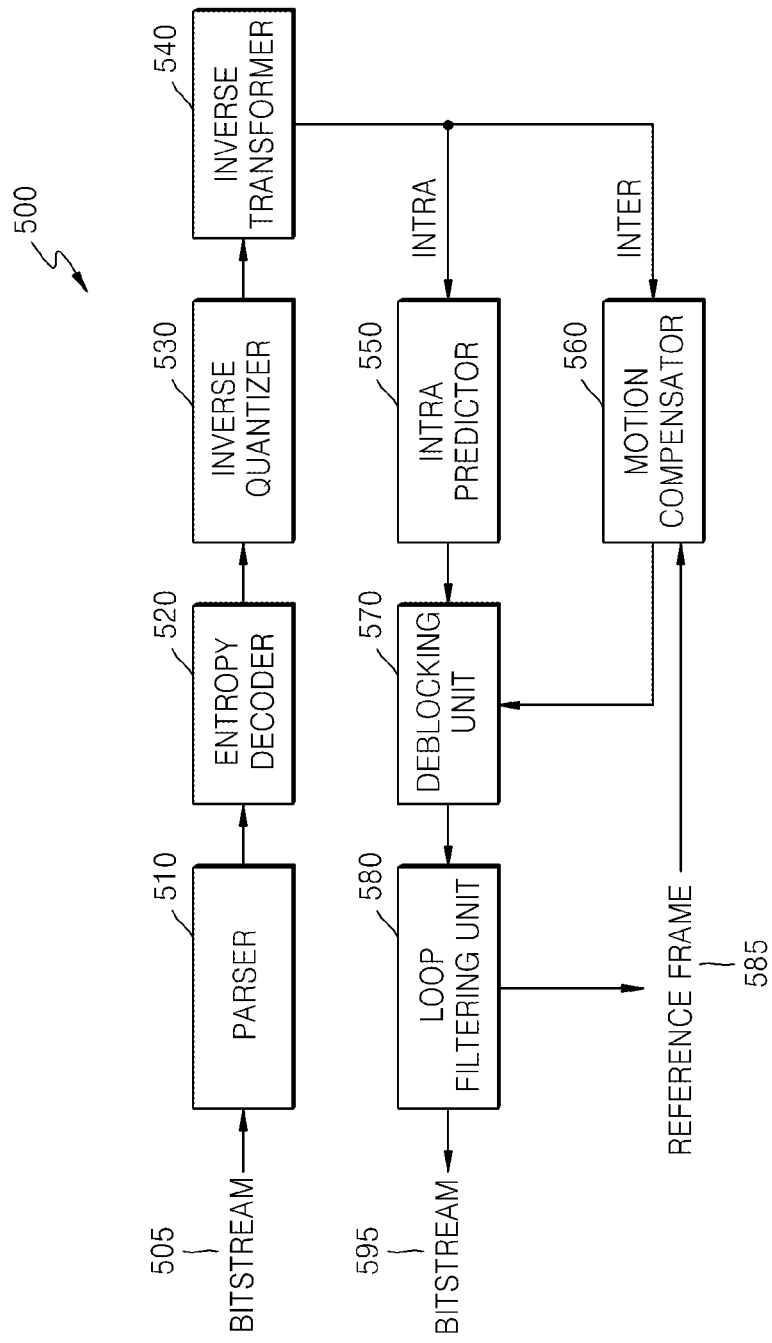
FIG. 15 is a block diagram of a video decoding apparatus based on hierarchical coding units according to an embodiment of the present invention.

FIG. 15 is a block diagram of an image decoding apparatus based on coding units of a hierarchical structure, according to an embodiment of the present invention.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data, which is post-processed through the deblocking unit 570 and the loop filtering unit 580, may be output as the reference frame 585.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

Figure 16:
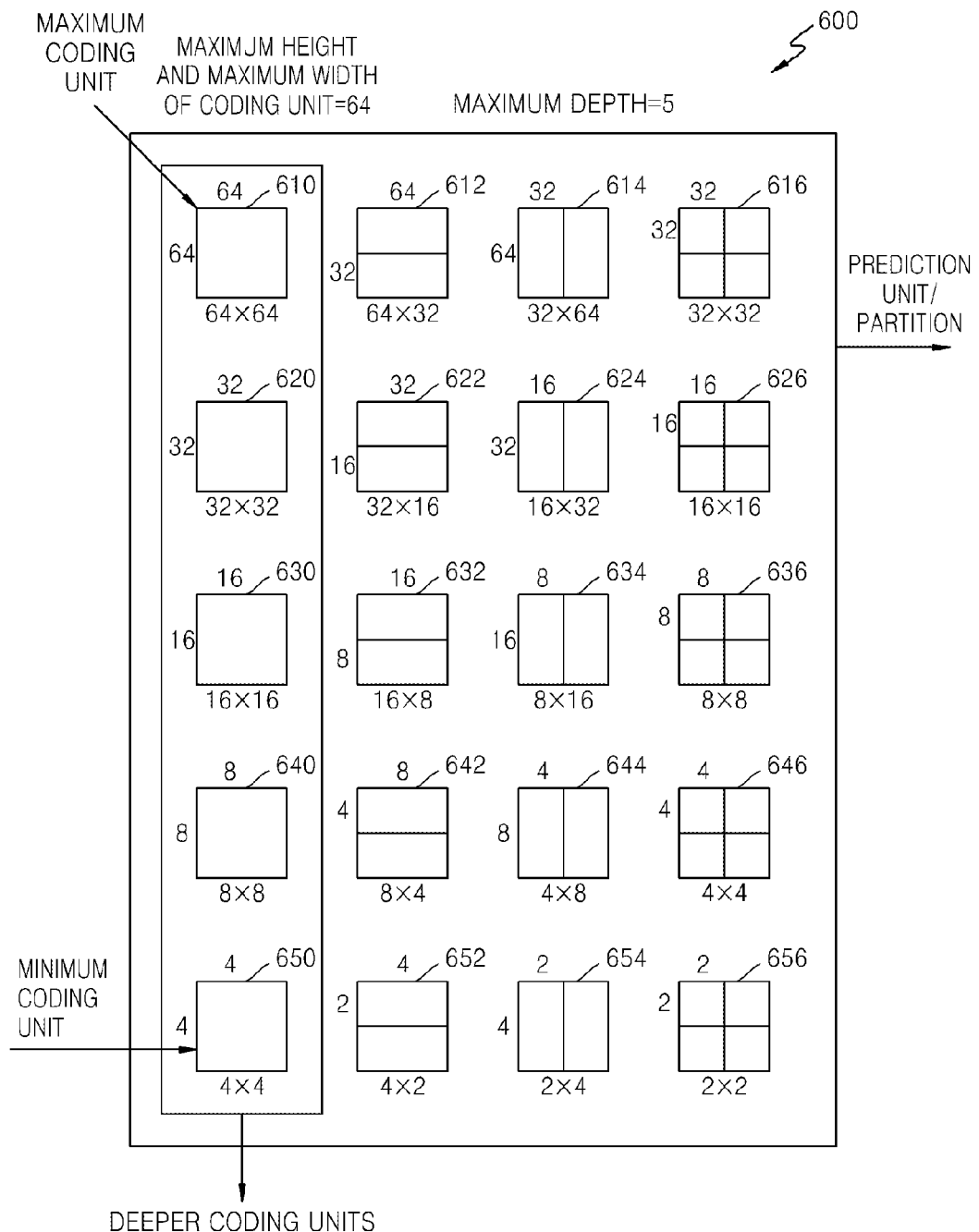
FIG. 16 is a diagram illustrating coding units according to depths, and partitions, according to an embodiment of the present invention.

FIG. 16 is a diagram illustrating coding units according to depths, and partitions, according to an embodiment of the present invention.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an embodiment of the present invention, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 11 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 12 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 23 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 14 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 12 are required to cover data that is included in one coding unit corresponding to a depth of 11. Accordingly, in order to compare encoding results of the same data according to depths, the coding unit corresponding to the depth of 11 and four coding units corresponding to the depth of 12 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths and performing encoding for each depth as the depth deepens along the vertical axis of the hierarchical structure 600. A depth and a partition having the minimum encoding error in the coding unit 610 may be selected as the coded depth and a partition type of the coding unit 610.

Figure 17:
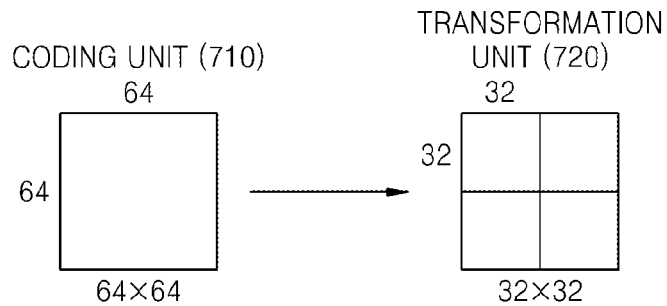
FIG. 17 is a diagram for describing a relationship between a coding unit and transformation units, according to an embodiment of the present invention.

FIG. 17 is a diagram for describing a relationship between a coding unit 710 and transformation units 720, according to an embodiment of the present invention.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 18:
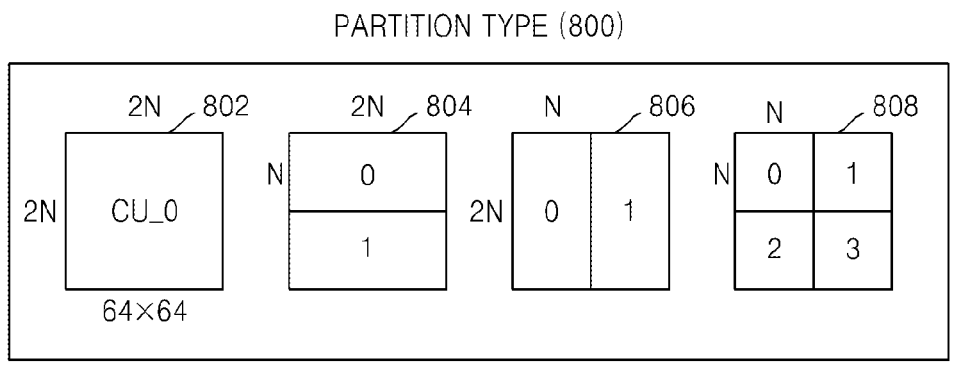
FIG. 18 is a diagram for describing encoding information of coding units corresponding to a coded depth, according to an embodiment of the present invention.
Figure 18:
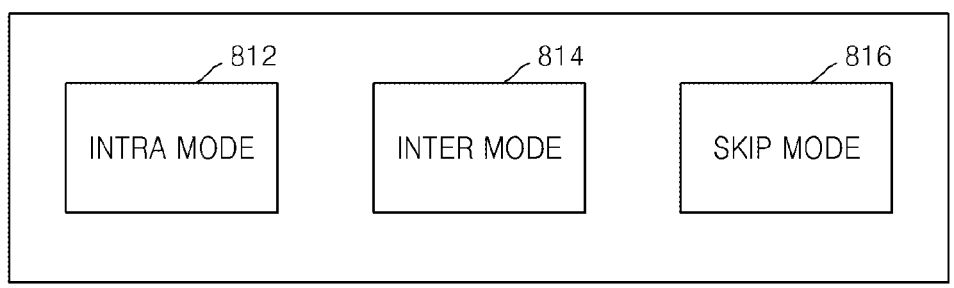
Figure 18:
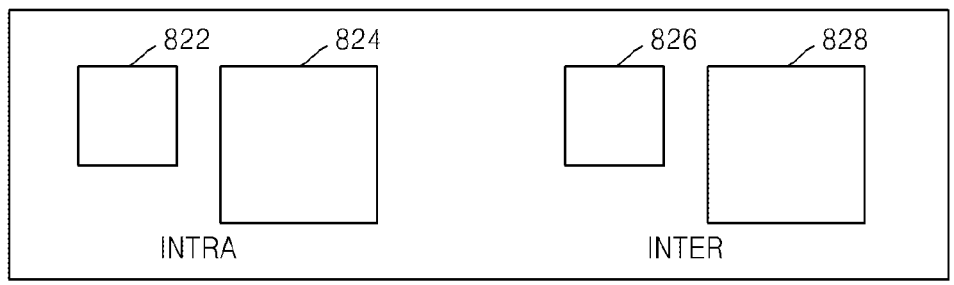

FIG. 18 is a diagram for describing encoding information of coding units corresponding to a coded depth, according to an embodiment of the present invention.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 may extract and use the information 800, 810, and 820 for decoding, according to each deeper coding unit.

Figure 19:
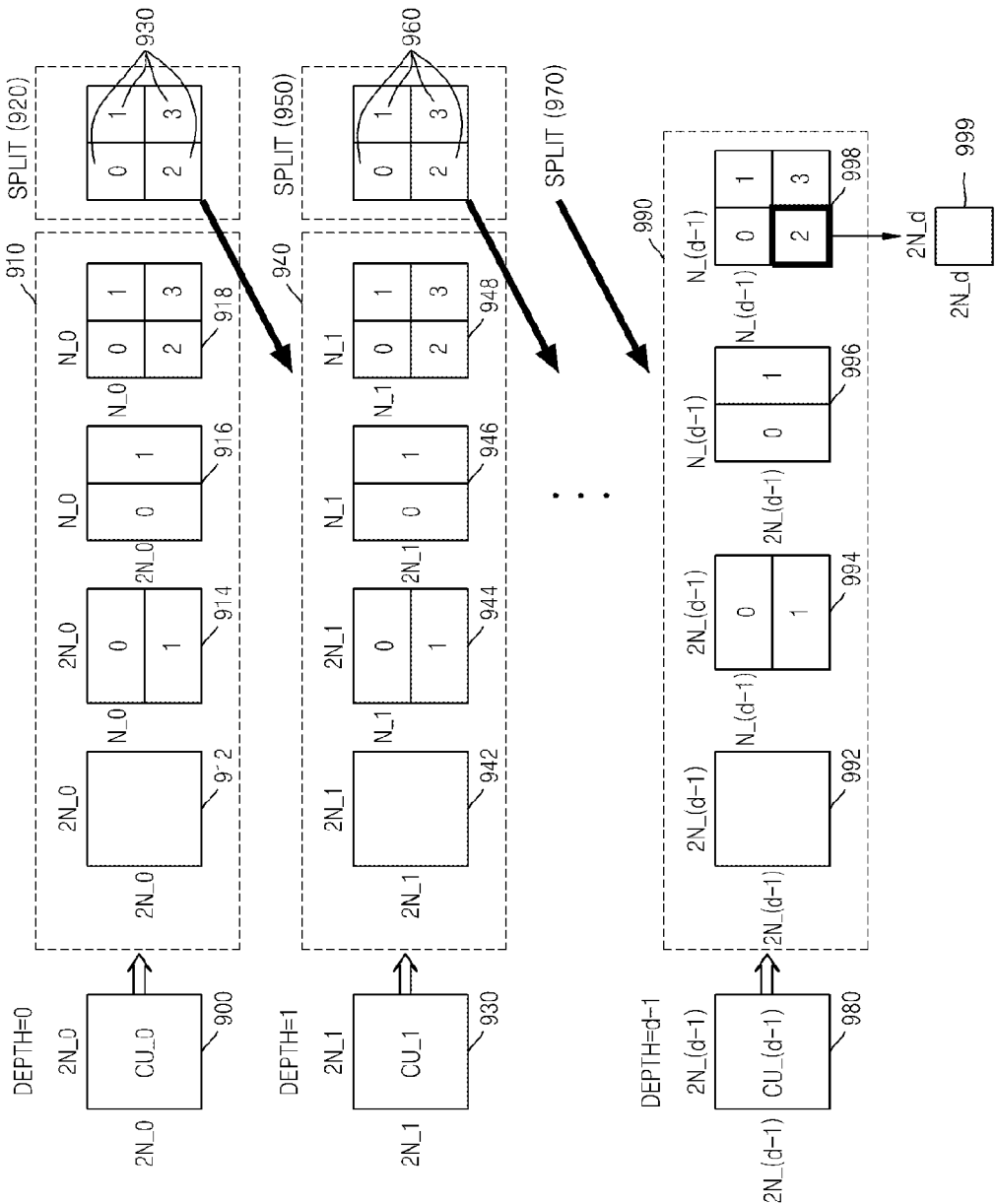
FIG. 19 is a diagram of coding units according to depths, according to an embodiment of the present invention.

FIG. 19 is a diagram of deeper coding units according to depths, according to an embodiment of the present invention.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 19 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0× 2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916 having the sizes of 2N_0×2N_0, 2N_0×N_0, and N_0×2N_0, the prediction unit 910 may not be split into a lower depth.

If the encoding error is the smallest in the partition type 918 having the size of N_0×N_0, a depth is changed from 0 to 1 to split the partition type 918 in operation 920, and encoding is repeatedly performed on coding units 930 having a depth of 12 and a size of N_0×N_0 to search for a minimum encoding error.

A prediction unit 940 for prediction encoding the coding unit 930 having a depth of 11 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth is changed from 11 to 12 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 having the size of N_(d−1)×N_(d−1) has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an embodiment of the present invention may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| | Split Information 0 (Encoding on Coding Unit having Size of 2N × 2N and Current Depth of d) | | | | Split Information 1 |
|---|---|---|---|---|---|
| | | | Size of Transformation Unit | | |
| | Partition Type | | Split Information 0 of Transformation Unit | Split Information 1 of Transformation Unit | |
| Prediction Mode | Symmetrical Partition Type | Asymmetrical Partition Type | | | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

Figure 20:
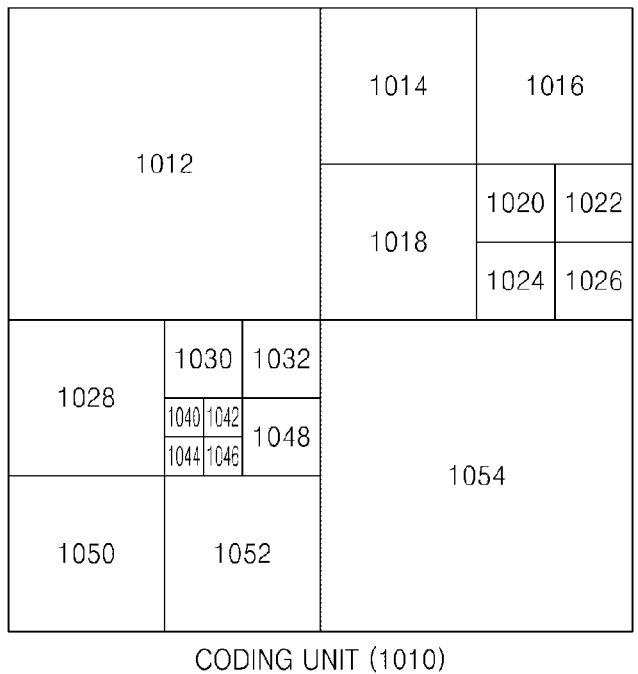
FIGS. 20 through 22 are diagrams for describing a relationship between coding units, prediction units, and frequency transformation units, according to an embodiment of the present invention.
Figure 21:
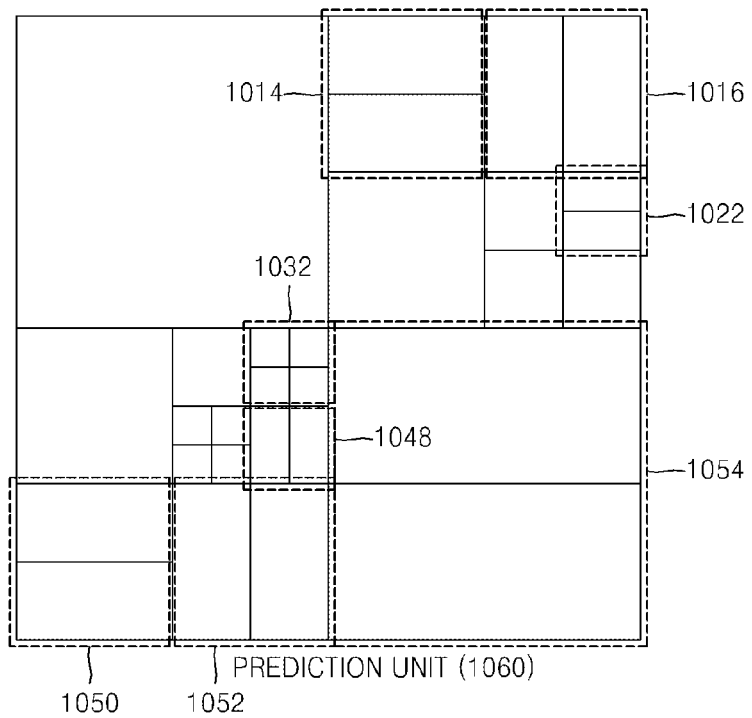
Figure 22:
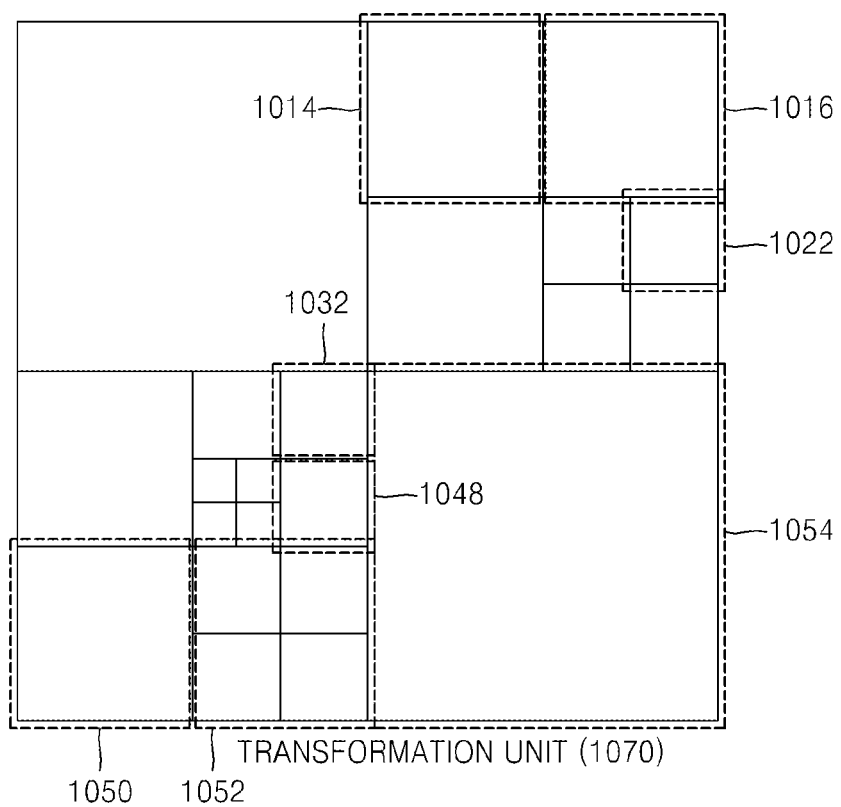

FIGS. 20 through 22 are diagrams for describing a relationship between coding units 1010, prediction units 1060, and transformation units 1070, according to an embodiment of the present invention.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

The entropy encoder 120 of the video encoding apparatus 100 may output the encoding information about the coding units having a tree structure, and the entropy decoder 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:n (where n is an integer greater than 1) and n:1, and the asymmetrical partition types having the sizes of nL×2N and nR×2N may be respectively obtained by splitting the width of the prediction unit in 1:n and n:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 23:
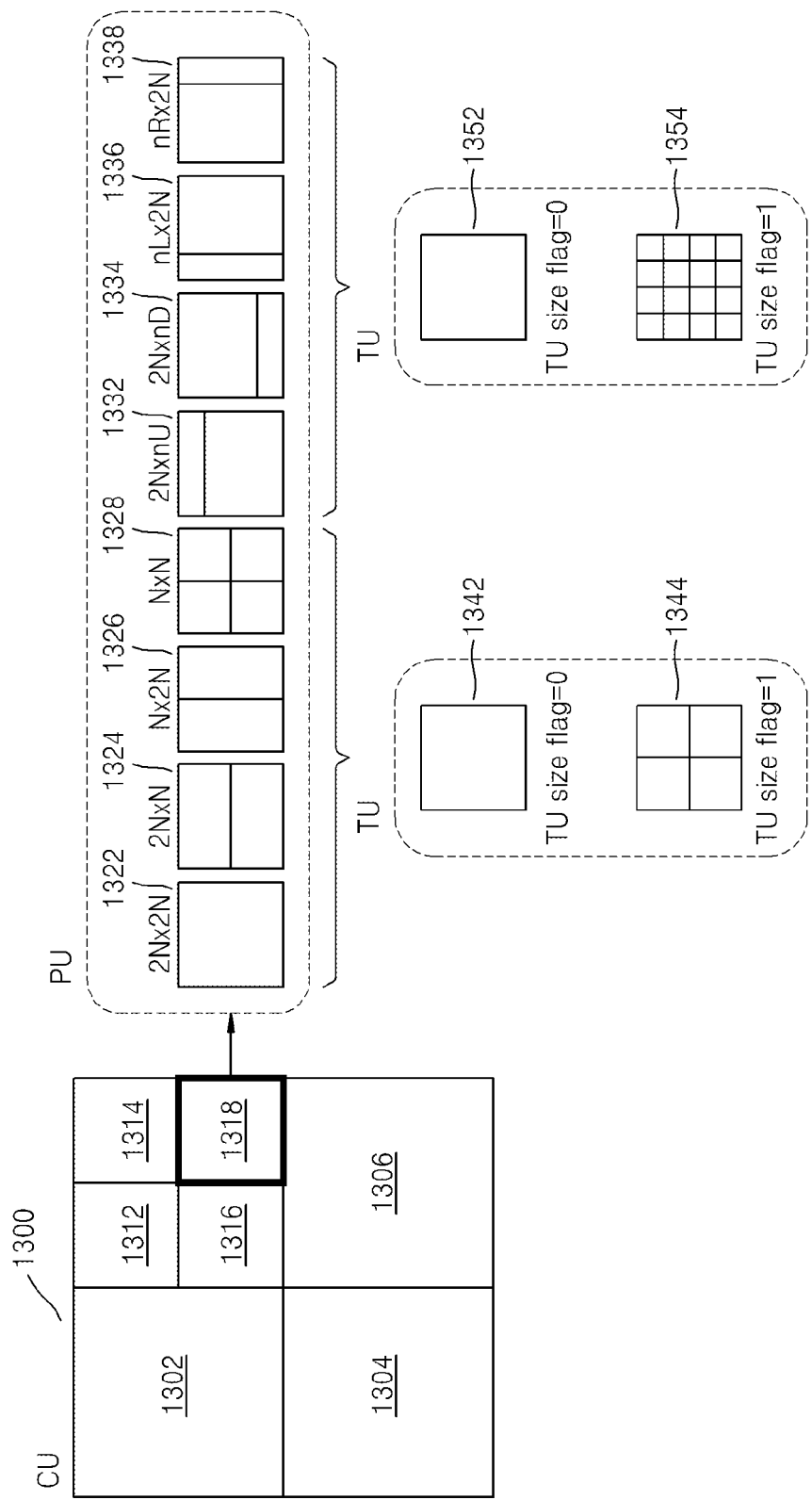
FIG. 23 is a diagram for describing a relationship between a coding unit, a prediction unit, and a transformation unit, according to encoding mode information of Table 1.

FIG. 23 is a diagram for describing a relationship between a coding unit, a prediction unit, and a transformation unit, according to the encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Split information (TU (Transformation Unit)size flag) of a transformation unit is a type of a transformation index. The size of the transformation unit corresponding to the transformation index may be changed according to a prediction unit type or partition type of the coding unit.

For example, when the partition type is set to be symmetrical, i.e. the partition type 2N×2N (1322), 2N×N (1324), N×2N (1326), or N×N (1328), a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 2N×nU (1332), 2N×nD (1334), nL×2N (1336), or nR×2N (1338), a transformation unit 1352 having a size of 2N×2N is set if a TU size flag is 0, and a transformation unit 1354 having a size of N/2×N/2 is set if a TU size flag is 1.

Referring to FIG. 19, the TU size flag is a flag having a value or 0 or 1, but the TU size flag is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an embodiment of the present invention, together with a maximum size and minimum size of the transformation unit. According to an embodiment of the present invention, the video encoding apparatus 100 is capable of encoding maximum transformation unit size information, minimum transformation unit size information, and a maximum TU size flag. A result of encoding the maximum transformation unit size information, the minimum transformation unit size information, and the maximum TU size flag may be inserted into an SPS. According to an embodiment of the present invention, the video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$CurrMinTuSize = \max(MinTransformSize, RootTuSize/(2^{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment of the present invention, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize = \min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize = \min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of prediction mode in a partition unit is just an example and the present invention is not limited thereto.

The embodiments of the present invention may be written as computer programs and may be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). The computer readable recording medium may also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for decoding a video, the apparatus comprising:
a syntax element decoder configured to:
obtain a coded block flag indicating whether a transformation block includes at least one non-zero significant transformation coefficient;
when the coded block flag indicates the transformation block includes at least one non-zero significant transformation coefficient, obtain an x coordinate prefix bitstring of the last significant coefficient in a transformation block by performing context-based-arithmetic decoding on a bitstream;
obtain a y coordinate prefix bitstring of the last significant coefficient by performing context-based-arithmetic decoding on the bitstream;
obtain an x coordinate suffix bitstring of the last significant coefficient by performing bypass mode decoding on the bitstream;
obtain a y coordinate suffix bitstring of the last significant coefficient by performing bypass mode decoding on the bitstream;
obtain an inverse-binarized x coordinate prefix and an inverse-binarized y coordinate prefix by performing inverse binarization according to a first binarization method on the x coordinate prefix bitstring and the y coordinate prefix bitstring;
obtain an inverse-binarized x coordinate suffix and an inverse-binarized y coordinate suffix by performing inverse binarization according to a second binarization method on the x coordinate suffix bitstring and the y coordinate suffix bitstring;
reconstruct an x coordinate of the last significant coefficient based on the inverse-binarized x coordinate prefix and the inverse-binarized x coordinate suffix; and
reconstruct a y coordinate of the last significant coefficient based on the inverse-binarized y coordinate prefix and the inverse-binarized y coordinate suffix,
wherein, after the x coordinate prefix bitstring and the y coordinate prefix bitstring are obtained via the context-based-arithmetic decoding, the x coordinate suffix bitstring and the y coordinate suffix bitstring are obtained via the bypass mode decoding, and
wherein the transformation block is split from a coding unit based on a transformation block split information.

2. The apparatus of claim 1, wherein an image is split into a plurality of maximum coding units,
a maximum coding unit, among the plurality of maximum coding units, is hierarchically split into one or more coding units of depths according to coding unit split information,
when the coding unit split information indicates that the coding unit of a current depth is split, the coding unit of the current depth is split into four rectangular coding units of a lower depth, independently from neighboring coding units,
when the coding unit split information indicates that the coding unit of the current depth is not split, one or more prediction units are obtained from the coding unit of the current depth and prediction is performed on the one or more prediction units, and one or more transformation units, including the transformation block, are obtained from the coding unit of the current depth and inverse-transformation is performed on the one or more transformation units.

* * * * *